US007046788B2

(12) United States Patent
Schmechel et al.

(10) Patent No.: US 7,046,788 B2
(45) Date of Patent: May 16, 2006

(54) SAS APPLICATION SERVICE

(75) Inventors: Johannes Schmechel, Eisingen (DE); Bernd Gasser, Leinfelden-Echterdingen (DE); Klaus-Peter Kuemmel, Fellbach (DE); Heidi Wörfel, Remseck (DE); Martin Beller, Korntal (DE); Stephan Blachut, Ditzingen (DE); Anne Budnik, Stuttgart (DE); Ulrich Ehret, Ditzingen (DE); Bernd Fröhlich, Stuttgart (DE); Dieter Gramsch, Korntal (DE); Reinhard Hein, Löchgau (DE); Bernd Kütting, Remseck (DE); Thomas Milbredt, Leonberg (DE); Andreas Rösler, Weil der Stadt (DE); Bernd Schnaitmann, Ludwigsburg (DE); Uwe Spitzer, Backnang (DE); Ulrich Stosshoff, Markgröningen (DE); Ralf Zieg, Stuttgart (DE)

(73) Assignee: Alcatel, Paris (FR)

( * ) Notice: Subject to any disclaimer, the term of this patent is extended or adjusted under 35 U.S.C. 154(b) by 149 days.

(21) Appl. No.: 10/802,826

(22) Filed: Mar. 18, 2004

(65) Prior Publication Data

US 2004/0184594 A1 Sep. 23, 2004

(30) Foreign Application Priority Data

Mar. 19, 2003 (EP) .................................. 03290703

(51) Int. Cl.
*H04L 12/28* (2006.01)
*H04M 7/00* (2006.01)

(52) U.S. Cl. ................. 379/221.08; 370/351; 370/389; 379/221.1; 379/221.11; 379/221.12

(58) Field of Classification Search ................ 370/351, 370/352, 353, 354, 355, 356, 389; 379/221.08, 379/221.09, 221.1, 221.11, 221.12, 230
See application file for complete search history.

(56) References Cited

U.S. PATENT DOCUMENTS 5,712,908 A * 1/1998 Brinkman et al. ..... 379/114.28
5,768,361 A 6/1998 Cowgill (Continued)

FOREIGN PATENT DOCUMENTS

EP 1 139 674 A2 10/2001

OTHER PUBLICATIONS

U.S. Appl. No. 10/642,687 filed Aug. 19, 2003, entitled "SCCP Local Uwer Escape Method".

(Continued)

*Primary Examiner*—Harry S. Hong
(74) *Attorney, Agent, or Firm*—Sughrue Mion, PLLC

(57) ABSTRACT

It is an object of the invention to provide an advantageous method to process a SAS Application Service request. An inventive method to process a SAS Application Service request includes the steps of: performing an Inbound Message Analysis, performing a Service Decision, performing an Outbound Message Synthesis, wherein the Inbound Message Analysis includes an Application Specific Inbound Protocol Check, an NoAI (Nature of Address Indicator) Analysis and an Inbound Digit Analysis, wherein the Service Decision includes a Database Search and an Application Specific Evaluation of Database Search Indications, and wherein the Outbound Message Synthesis includes generating an Output Digit String making use of an application specific Output Digit String Configuration Table, which includes the parameter SAS Application Service Id and at least one of the following parameters: Output Digit String Id, Auxiliary Number Name, Nature of Address Indicator, Auxiliary Number Presence, Auxiliary Number Position.

13 Claims, 18 Drawing Sheets

U.S. PATENT DOCUMENTS

| | | | |
|---|---|---|---|
| 6,011,803 A * | 1/2000 | Bicknell et al. | 370/467 |
| 6,366,658 B1 * | 4/2002 | Bjornberg et al. | 379/221.08 |
| 6,535,599 B1 | 3/2003 | Torrey et al. | |
| 6,631,186 B1 * | 10/2003 | Adams et al. | 379/201.12 |
| 6,662,017 B1 * | 12/2003 | McCann et al. | 455/461 |
| 6,714,533 B1 * | 3/2004 | Weich et al. | 370/352 |
| 6,731,741 B1 * | 5/2004 | Fourcand et al. | 379/221.08 |
| 6,826,198 B1 * | 11/2004 | Turina et al. | 370/467 |
| 2001/0029182 A1 | 10/2001 | McCann et al. | |
| 2002/0131400 A1 * | 9/2002 | Tinsley et al. | 370/352 |
| 2003/0228012 A1 * | 12/2003 | Williams et al. | 379/212.01 |
| 2005/0152383 A1 * | 7/2005 | Schantz | 370/410 |

OTHER PUBLICATIONS

U.S. Appl. No. 10/656,125 filed Sep. 8, 2003, entitled, "SS7 Signaling Server with Integrated Advanced Signaling Services".

* cited by examiner

SAS APPLICATION SERVICE

The invention is based on a priority application EP 03290703.2 which is hereby incorporated by reference.

TECHNICAL FIELD OF THE INVENTION

This invention is related in general to the field of telecommunications systems. More particularly, the invention is related to a SS7 signaling server and method for routing SS7 links in a telecommunications network. More particularly, the invention is related to a SAS Application Service. The invention is related to the European patent applications EP 02360267.5, now U.S. Ser. No. 10/656,125, and EP 02360268.3 which hereby, now U.S. Ser. No. 10/642,687, are incorporated by reference.

BACKGROUND OF THE INVENTION

A SS7 signaling server for routing SS7 links includes a signaling transfer point (STP) and a signaling application server (SAS). The SAS is capable to process at least one application process. Each application process, e.g. an individual INAP, MAP, CAP, or any TCAP User, TCAP Relay, or SCCP Relay service request has to be identified and processed.

The SS7 signaling server for routing SS7 links, includes e.g. a signaling transfer point (STP) and a signaling application server (SAS); SS7=Signaling System No. 7. STP and SAS have different functionalities. The STP has at least one external interface to connect the STP via at least one SS7 link to at least one telecommunications unit, and an internal interface to connect the STP to the SAS. The STP processes incoming SS7 messages, e.g. in the MTP1, MTP2, MTP3, and SCCP layer. The SAS is capable to process at least one application service request, advantageously at least two different application service requests. The STP identifies a single application service request in one incoming SS7 message and provides the identified single application service request to the SAS for further processing. The SAS has e.g. two TCAP processes to identify two different application services, e.g. INAP and MAP. STP and SAS are interconnected via an internal interworking protocol, e.g. using TCP/IP (transmission control protocol/internet protocol). The interworking protocol is called Advanced Signaling Transport Protocol (ASTP).

The signaling server is e.g. highly configurable and efficient regarding run-time. The signaling server is capable of processing multiple application service requests, e.g. mobile number portability (MNP), service number portability (SNP), screening, intelligent network (IN) services, TCAP services, MAP services, CAP services, TCAP Relay, TCAP User Relay, SCCP Relay.

The SS7 signaling server for routing SS7 links, includes e.g. a signaling transfer point (STP) and a signaling application server (SAS),
  wherein the STP has at least one external interface to connect the STP via at least one SS7 link to at least one telecommunications unit, and an internal interface to connect the STP to the SAS,
  wherein the SAS is capable to process at least one service requst, advantageously at least two different application service requests, and
  wherein the STP is capable to process incoming SS7 messages, to identify a single application service request in one incoming SS7 message, to provide the identified single application service request to the SAS for further processing.

SUMMARY OF THE INVENTION

It is an object of the invention to provide an advantageous method to process a SAS Application Service request.

An inventive method to process a SAS Application Service request includes the steps of: performing an Inbound Message Analysis, performing a Service Decision, performing an Outbound Message Synthesis, wherein the Inbound Message Analysis includes an Application Specific Inbound Protocol Check, an NoAI (Nature of Address Indicator) Analysis and an Inbound Digit Analysis, wherein the Service Decision includes a Database Search and an Application Specific Evaluation of Database Search Indications, and wherein the Outbound Message Synthesis includes generating an Output Digit String making use of an application specific Output Digit String Configuration Table, which includes the parameter SAS Application Service Id and at least one of the following parameters: Output Digit String Id, Auxiliary Number Name, Nature of Address Indicator, Auxiliary Number Presence, Auxiliary Number Position.

In a preferred embodiment of the invention the Outbound Message Synthesis includes generating an Output Digit String making further use of at least one Outbund Processing Configuration Table, which includes the parameter SAS Application Service Id and at least one of the following parameters: Number Type, Portability Status, Inbound NoAI Value, Response Action Id, Output Digit String Id.

In a further preferred embodiment of the invention the Service Decision further includes a Generic Loop Detection Analysis making use of at least one application specific Loop Detection Configuration Table, which includes the parameter SAS Application Service Id and at least one of the following parameters: SAS Database Id, SAS Database Table Id, Number type, Portability Status, Loop Detection state and Action.

Advatageously the Database Search is performed in a Single Number Table and subsequently in a Range Number Table if the Single Number Table query indicates a NO MATCH or an Error in the Single Number Table.

The invention can be used for a variety of services:

In a first embodiment the SAS Application Service is INAP based Number Portability, and the Output Digit String Configuration Table includes INAP based Number Portability Ids (MNP-INAP-O-VM-IW).

In a second embodiment the SAS Application Service is SRI (Send Routing Information) terminating Number Portability, and the Output Digit String Configuration Table includes SRI terminating Number Portability Ids (MNP-SRIt-O-VM-IW).

In a third embodiment the SAS Application Service is MAP Forward Short Message Access Screening, and the Output Digit String Configuration Table includes Forward Short Message Access Screening Ids (MAP-FSM).

In a fourth embodiment the SAS Application Service is Fixed SCCP Routing, and the Output Digit String Configuration Table includes Fixed SCCP Routing Ids (FNP-SRF).

In a fifth embodiment the SAS Application Service is CAP IDP Relay Mobile Number Portability, and the Output Digit String Configuration Table includes CAP IDP Relay Mobile Number Portability Ids (MNP-CAP-RELAY-IW).

In a sixth embodiment the SAS Application Service is INAP IDP Relay, and the Output Digit String Configuration Table includes INAP IDP Relay Ids (INAP-IDP-RELAY-I/W).

In a seventh embodiment the SAS Application Service is Mobile SCCP Routing, and the Output Digit String Configuration Table includes Mobile SCCP Routing Ids (MNP-NCR).

The inventive method could be implemented using different kind of hardware and software equipment, e.g.:

An inventive Signaling application server (SAS) comprises at least one processor, at least one database and at least one processing software for processing at least one application service request, wherein the at least one processing software is programmed in such a way that identifying and processing at least one application service request is enabled—including e.g. a signaling connection control part (SCCP) process and/or at least one transaction capabilities application part (TCAP) process to identify at least one application service request—, and wherein processing a SAS application service, comprises the steps of:

performing an inbound message analysis, performing a Service Decision including a database search, performing an Outbound Message Synthesis including generating an Output Digit String making use of an application specific Output Digit String Configuration Table, which includes the parameter SAS Application Service Id and at least one of the following parameters: Output Digit String Id, Auxiliary Number Name, Nature of Address Indicator, Auxiliary Number Presence, Auxiliary Number Position.

An inventive SS7 signaling server for routing SS7 links, includes a signaling transfer point (STP), and a signaling application server (SAS), wherein the STP has at least one external interface to connect the STP via at least one SS7 link to at least one telecommunications unit, and an internal interface to connect the STP to the SAS, wherein the SAS comprises at least one processor, at least one database and at least one processing software for processing at least one application service request, wherein processing a SAS application service, comprises the steps of:

performing an inbound message analysis, performing a Service Decision, performing an Outbound Message Synthesis including generating an Output Digit String making use of an application specific Output Digit String Configuration Table, which includes the parameter SAS Application Service Id and at least one of the following parameters: Output Digit String Id, Auxiliary Number Name, Nature of Address Indicator, Auxiliary Number Presence, Auxiliary Number Position, and wherein the STP is capable to process incoming SS7 messages, to identify a single application service request in one incoming SS7 message, to provide the identified single application service request to the SAS for further processing.

BRIEF DESCRIPTION OF THE DRAWINGS

For a better understanding of the present invention, reference is made to the accompanying drawings, in which.

DETAILED DESCRIPTION OF THE INVENTION

Figure 1:
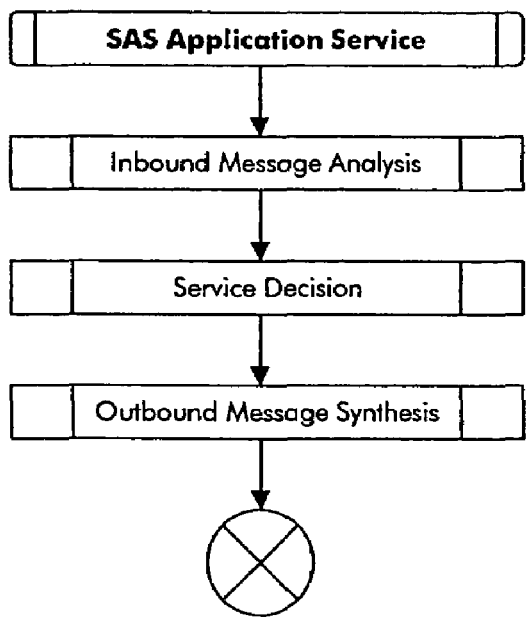
FIG. 1 shows the Generic Structure of a SAS Application Service.

The preferred embodiments of the present invention are illustrated in FIGS. 1–32, like reference numerals being used to refer to like and corresponding parts of the various drawings.

First Embodiment of the Invention

INAP Based Number Portability

Short Description:

This service embraces INAP NP (Number Portability) with optionally voice mail for both mobile and fixed network, which may request one or more digits if the number is either incomplete or ambiguous. All these combinations are configurable.

The calling number of the INAP IDP message and optionally the additional digits of the ERB message are used to interrogate the subscriber database. The database contents and the configuration data are used to examine what kind of message is send and what number the message is filled with.

FIG. 1 depicts the SDL diagram of the Generic Structure of the INAP IDP Application Service.

FIG. 1 shows the Generic Structure of a SAS Application Service.

The three stages of the Application Service:

Inbound Message Analysis:

This stage starts with some service specific inbound protocol checks, e.g. decoded operation code, calling and called number size. If the values are ok, both numbers are extracted for further usage.

The NoA (Nature of Address) is extracted from the calling address in the calling number field.

Depending on the NoA a specific analyse string is chosen. That analyse string describes which auxiliary number parts are mandatory or optionally. Then the auxiliary number parts are analysed. If found and correct, then remove auxiliary number part from received E.164 or MSIN Based number and store it internally. E.164 is e.g. defined in ITU-T E.164, MSIN is e.g. defined in ITU-T E.212. This analysis is done step by step for each possible auxiliary number part. If ambiguous then one or more digits are requested, depending on service specific configuration items. When the analysis of the auxiliary number parts terminates successfully, then the second stage starts. Each auxiliary number part is to be stored in a record containing its name, its position, its value, and its presence. Inbound Processing is configured based on the specification of the received digit string and other application service specific configuration items.

The inbound digit anaylsis makes use of an input digit string configuration table. The inbound digit analysis e.g. serves to analyse the called or the calling party address. The input digit string configuration table includes at least two of the following parameters: SAS Application Service Id, Input Digit String Id, Auxiliary Number Name, Global Title Indicator, Nature of Address Indicator, Auxiliary Number Presence, Auxiliary Number Position.

Figure 2:
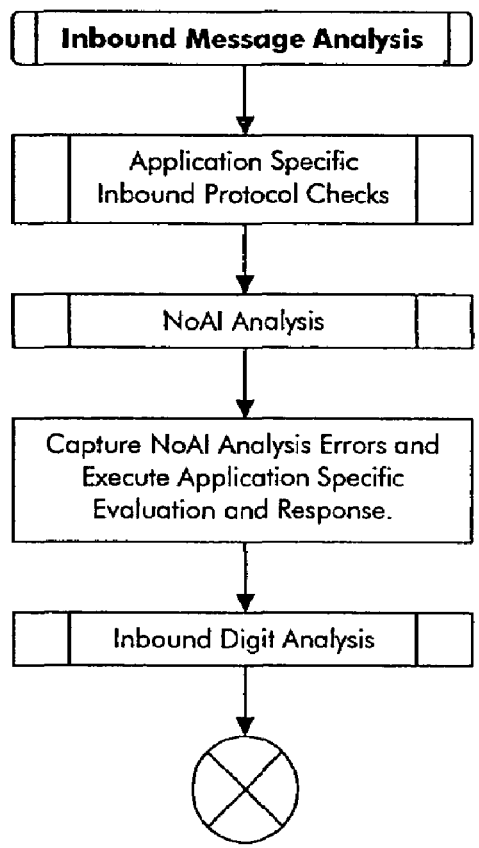
FIG. 2 shows Inbound Message Analysis including Inbound Address Analysis and Inbound Digit Analysis.

FIG. 2 shows Inbound Message Analysis including Inbound Address Analysis and Inbound Digit Analysis.

Service Decision:

This stage analyses the core part of the received number in the Single Number and Range Number tables. Additional digits might be requested. The Extended Match Indicator is to be used if required. Service Decision includes also Loop Detection. The Service Decision is executed dependent on configuration data items and the Transition Indicator, the Default/Exception Indicator, and the Single Number Flag of the Single Number and Range Number tables.

Figure 3:
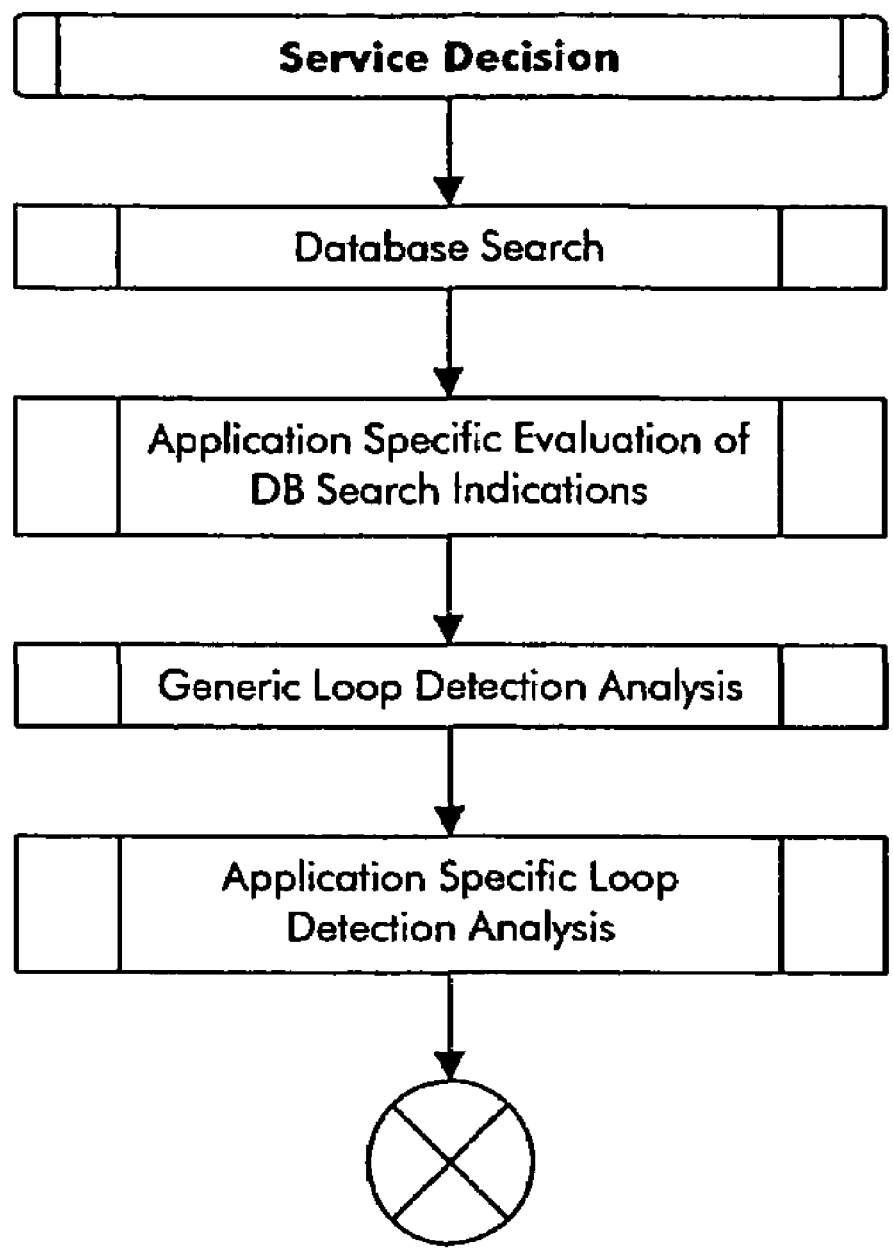
FIG. 3 shows Service Decision.

FIG. 3 shows Service Decision.

For those SAS Application Services that are required to search the E.164 or MSIN Based Tables for routing information, the following principles apply. The search of the E.164 or MSIN Based Tables constitutes the main service decision. Figure depicts the SDL diagram of the Service Decision.

Database Search

The Evaluation of Database Search Indications is a SAS Application Service specific matter, also the decision whether or not to perform another SAS Database search. The Application Specific Evaluation of Database Search Indications includes for instance actions like requesting additional digits in case the database search came back with an indication that the queried number was AMBIGUOUS. Both, the application specific evaluations and the decision for further database searches, depend on the SAS Application Service's service logic, configurable items such as "Open/Closed Numbering Plan", "Block/Single Number Dialling", "Request More Digits Yes/No", and other things.

Figure 4:
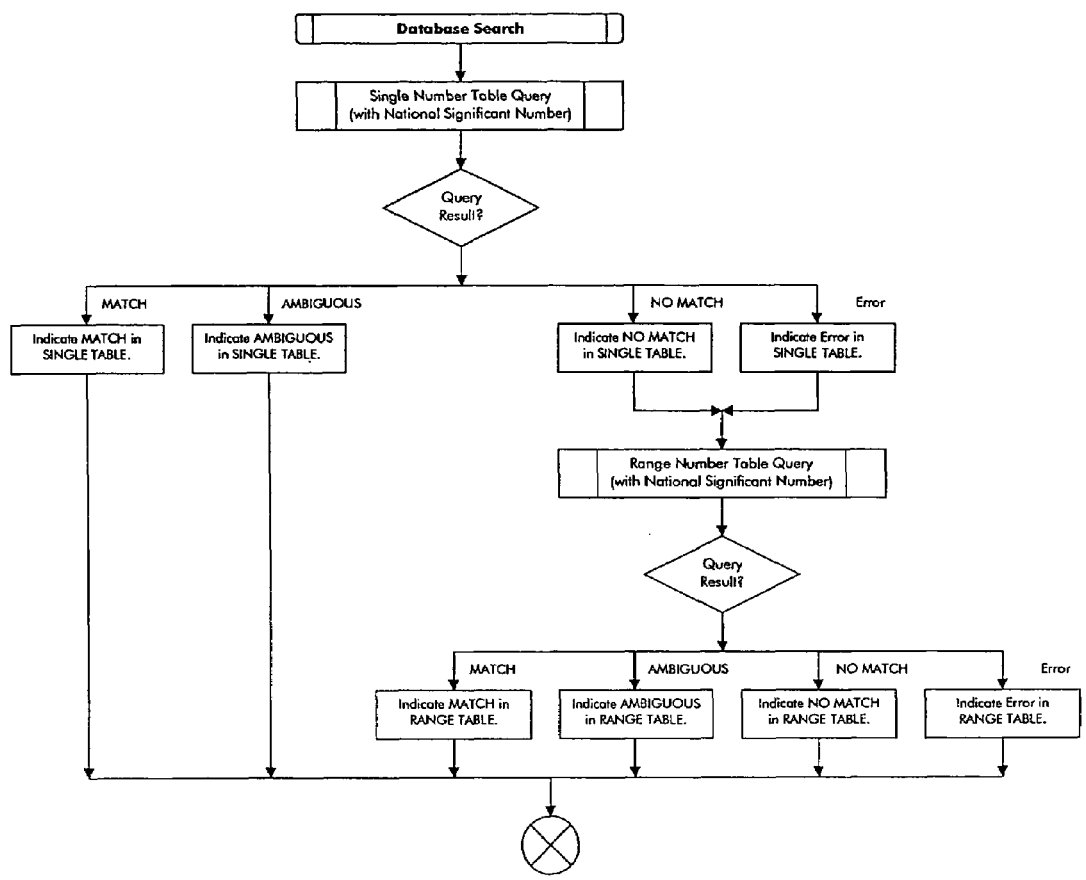
FIG. 4 shows a Database Search in E.164 and MSIN Based Single Number and Range Number Tables.

FIG. 4 shows a Database Search in E.164 and MSIN Based Single Number and Range Number Tables.

TABLE 1

E. 164 Single Number Table for the Example.
E. 164 Single Number Table

| E. 164 Number Length | E. 164 Number Value | Number Type | Portability Status | Default/ Exception Indicator | Transition Indicator | Extended Match Indicator | Extended Match Length | Service Control Data Slot-0 | Service Control Data Slot-1 | Service Control Data Slot-2 |
|---|---|---|---|---|---|---|---|---|---|---|
| 9 | 851230001 | MSISDN | ONPO | Exception | Over | Exact | 0 | SCDI-2 | — | — |
| 9 | 851230002 | MSISDN | ONPO | Exception | Not Over | Exact | 0 | SCDI-2 | — | — |
| 9 | 851230003 | MSISDN | ONPO | Exception | Over | Exact | 0 | SCDI-3 | | |
| 9 | 851230004 | MSISDN | ONPO | Exception | Not Over | Exact | 0 | SCDI-3 | | |
| 9 | 861230001 | MSISDN | FNPI | Exception | Over | Exact | 0 | SCDI-1 | SCDI-4 | — |
| 9 | 861230002 | MSISDN | FNPI | Exception | Not Over | Exact | 0 | SCDI-1 | SCDI-4 | |
| 9 | 871230001 | MSISDN | FNPI | Exception | Over | Exact | 0 | SCDI-1 | SCDI-4 | |
| 9 | 871230002 | MSISDN | FNPI | Exception | Not Over | Exact | 0 | SCDI-1 | SCDI-4 | |
| 9 | 861230003 | MSISDN | FNP2AFN | Exception | Over | Exact | 0 | SCDI-3 | — | — |
| 9 | 861230004 | MSISDN | FNP2AFN | Exception | Not Over | Exact | 0 | SCDI-3 | — | — |

TABLE 1-continued

E. 164 Single Number Table for the Example.
E. 164 Single Number Table

| E. 164 Number Length | E. 164 Number Value | Number Type | Portability Status | Default/ Exception Indicator | Transition Indicator | Extended Match Indicator | Extended Match Length | Service Control Data Slot-0 | Service Control Data Slot-1 | Service Control Data Slot-2 |
|---|---|---|---|---|---|---|---|---|---|---|
| 9 | 871230003 | MSISDN | FNP2AFN | Exception | Over | Exact | 0 | SCDI-2 | — | — |
| 9 | 871230004 | MSISDN | FNP2AFN | Exception | Not Over | Exact | 0 | SCDI-2 | — | — |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

TABLE 2

E. 164 Range Number Table for the Example.
E. 164 Range Number Table

| E. 164 Number Start Range Length | E. 164 Number Start Range Value | E. 164 Number End Range Length | E. 164 Number End Range Value | Number Type | Portability Status | Default/ Exception Indicator | Transition Indicator | Single Number Flag | Service Control Data Slot-0 | Service Control Data Slot-1 | Service Control Data Slot-2 |
|---|---|---|---|---|---|---|---|---|---|---|---|
| 9 | 850000000 | 9 | 859999999 | MSISDN | ONNPO | Default | Over | Range | SCDI-1 | SCDI-4 | — |
| 9 | 860000000 | 9 | 869999999 | MSISDN | FNNK2BP | Default | Over | Range | SCDI-2 | — | — |
| 9 | 870000000 | 9 | 879999999 | MSISDN | FNNK2BP | Default | Over | Range | SCDI-3 | — | — |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

TABLE 3

Service Control Data Table for the Example.
Service Control Data Table

| Service Control Data Id | Service Control Data Function | Service Control Data Type | Service Control Data Length | Service Control Data Value | Address Info Present Mask | NoAI | Numbering Plan | Cut Enable Mask | Cut Offset | Cut Length |
|---|---|---|---|---|---|---|---|---|---|---|
| SCDI-1 | Insert | INRN | 5 | 17685 | Not Present | NULL | NULL | Disabled | NULL | NULL |
| SCDI-2 | Insert | INRN | 5 | 17686 | Not Present | NULL | NULL | Disabled | NULL | NULL |
| SCDI-3 | Insert | INRN | 5 | 17687 | Not Present | NULL | NULL | Disabled | NULL | NULL |
| SCDI-4 | Replace | HLR-SCA | 12 | 353857000420 | Present | International | E. 164 | Disabled | NULL | NULL |

TABLE 4

Auxiliary Number Table for the Example.
Service Control Slots Configuration Table

| SAS Database Id | SAS Database Table Id | Service Control Slot Id | Service Control Type |
|---|---|---|---|
| MNP E. 164 Database 0 | E. 164 Single Number Table | 0 | INRN |
| MNP E. 164 Database 0 | E. 164 Single Number Table | 1 | HLR-SCA |
| MNP E. 164 Database 0 | E. 164 Single Number Table | 2 | — |
| MNP E. 164 Database 0 | E. 164 Single Number Table | 3 | — |

TABLE 4-continued

Auxiliary Number Table for the Example.
Service Control Slots Configuration Table

| SAS Database Id | SAS Database Table Id | Service Control Slot Id | Service Control Type |
|---|---|---|---|
| MNP E. 164 Database 0 | E. 164 Single Number Table | 4 | — |
| MNP E. 164 Database 0 | E. 164 Range Number Table | 0 | INRN |
| MNP E. 164 Database 0 | E. 164 Range Number Table | 1 | HLR-SCA |
| MNP E. 164 Database 0 | E. 164 Range Number Table | 2 | — |
| MNP E. 164 Database 0 | E. 164 Range Number Table | 3 | — |
| MNP E. 164 Database 0 | E. 164 Range Number Table | 4 | — |

Generic Loop Detection Analysis

Loop detection is provided to prevent signalling loops within the signalling network. Signalling loops may occur when the routing databases in different signalling networks contain inconsistent routing information for network subscribers. The ability to detect signalling loops is defined within the scope of each SAS Application Service and may not be present in all SAS Application Services. Also, the response taken to the detection of a signalling loop is defined within the scope of each SAS Application Service.

There are two kinds of loop detection: a generic one and an application specific one. The generic one is specified in detail here. The applications specific ones are specified at the respective SAS Application Services.

The generic mechanism for the detection of signalling loops is a two step process and requires the co-operation of the underlying switched network in order to succeed. First, the underlying switched network will pass any received Inter-Network Routing Number to the SAS as part of the concerned address (i.e. the SCCP Called Party Address GTAI). This first step signals the SAS Loop Detection algorithm that the signalling message has originated outside of the current signalling network. Secondly, the E.164 database(s) search must resolve to a combination of the pair (E.164 Number Type, Portability Status) that is marked as a candidate for looping. With these two criteria met, the signalling loop is detected.

This implies, that there has to be configuration table which indicates for each pair (E.164 Number Type, Portability Status), whether loop detection is to be enabled or not.

Figure 5:
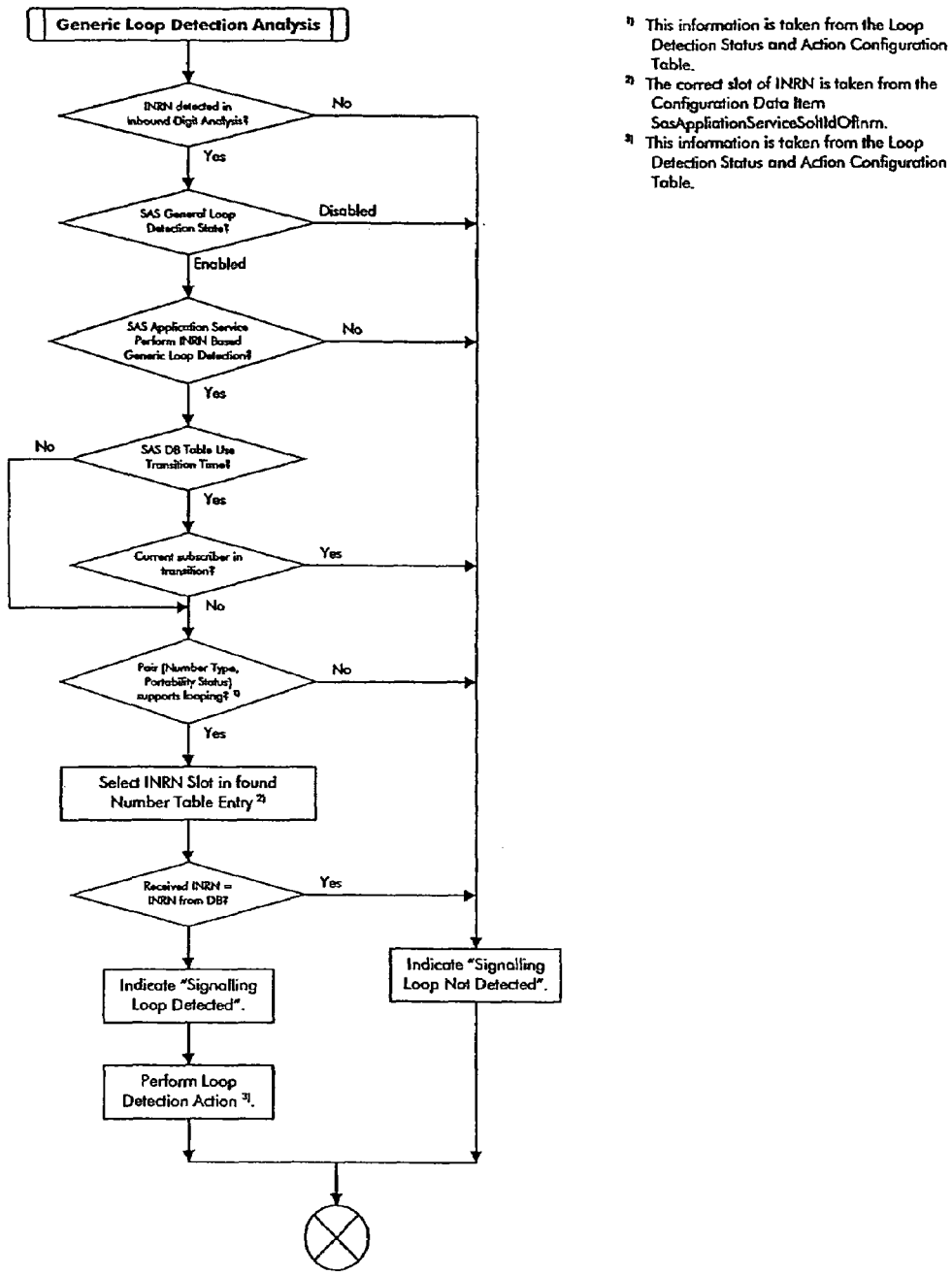
FIG. 5 shows a flowchart of a Generic Loop Detection Analysis.

FIG. 5 shows Generic Loop Detection Analysis.

As a temporary relaxation of the SAS Loop Detection, the Transition Time capability was introduced. This provides a synchronisation period for recent database updates. If the Transition Indicator is marked "Transition Time is not yet over", then the SAS Loop Detection is either bypassed or relaxed.

TABLE 5

Loop Detection Status and Action Configuration Table for the Example.
Loop Detection Status And Action Configuration Table

| SAS Application Service Id | SAS Database Id | SAS Database Table Id | Number Type | Portability Status | Loop Detection State And Action |
|---|---|---|---|---|---|
| MNP-INAP-O-VM-IW | MNP E. 164 Database 0 | E. 164 Single Number Table | MSISDN | ONNPO | Disabled |
| MNP-INAP-O-VM-IW | MNP E. 164 Database 0 | E. 164 Single Number Table | MSISDN | ONPO | Discard, Counter |
| MNP-INAP-O-VM-IW | MNP E. 164 Database 0 | E. 164 Single Number Table | MSISDN | FNPI | Discard, Counter |
| MNP-INAP-O-VM-IW | MNP E. 164 Database 0 | E. 164 Single Number Table | MSISDN | FNP2AFN | Discard, Counter |
| MNP-INAP-O-VM-IW | MNP E. 164 Database 0 | E. 164 Single Number Table | MSISDN | FNNK2BP | Disabled |
| MNP-INAP-O-VM-IW | MNP E. 164 Database 0 | E. 164 Range Number Table | MSISDN | ONNPO | Discard, Counter |
| MNP-INAP-O-VM-IW | MNP E. 164 Database 0 | E. 164 Range Number Table | MSISDN | ONPO | Disabled |
| MNP-INAP-O-VM-IW | MNP E. 164 Database 0 | E. 164 Range Number Table | MSISDN | FNPI | Disabled |
| MNP-INAP-O-VM-IW | MNP E. 164 Database 0 | E. 164 Range Number Table | MSISDN | FNP2AFN | Disabled |
| MNP-INAP-O-VM-IW | MNP E. 164 Database 0 | E. 164 Range Number Table | MSISDN | FNNK2BP | Discard, Counter |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

Outbound Message Synthesis:

Depending on the result of this database query and the inbound processing, the response is generated. Outbound processing is configured based on the specification of the digit string to be sent off, the Service Control Data Record, the Number Type and the Portability Status, and other configuration data items.

Figure 6:
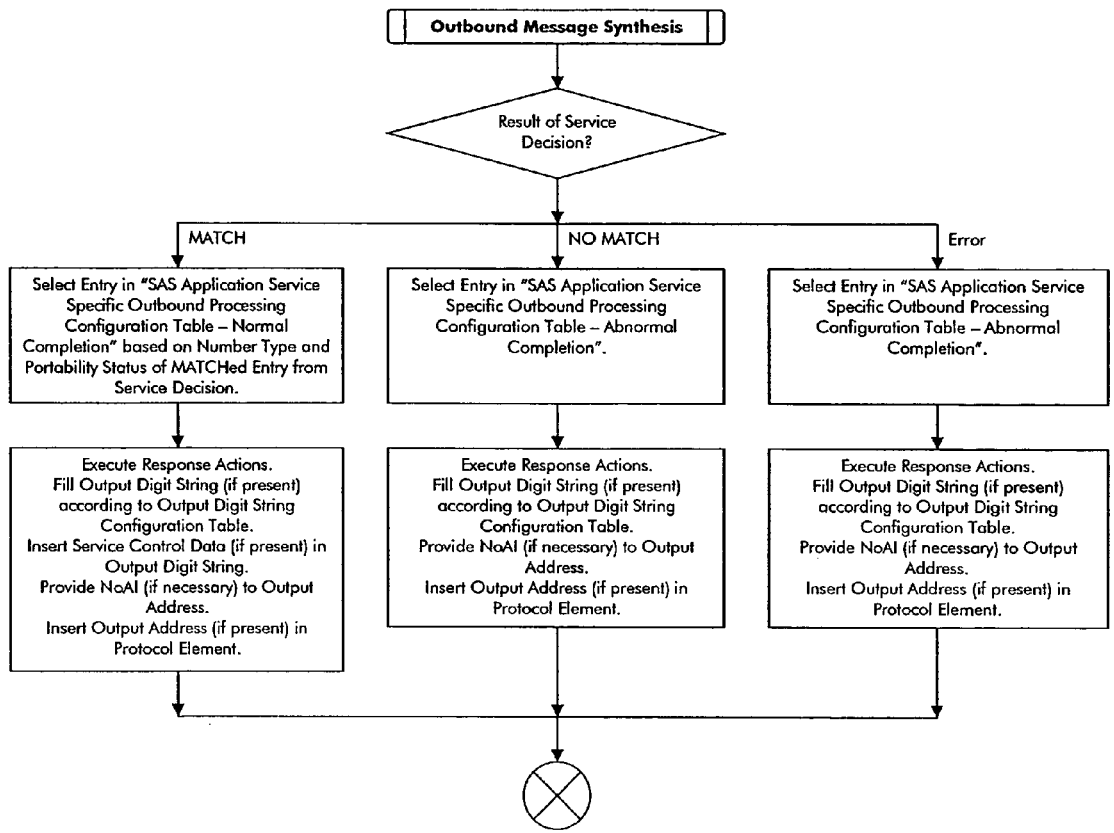
FIG. 6 shows a flowchart of Generic Aspects of Outbouznd Message Synthesis.

FIG. 6 shows Generic Aspects of Outbound Message Synthesis.

Configuration tables control Outbound Message Synthesis. The configuration tables of the Outbound Message Synthesis are illustrated by an example. The SAS Application Service is the same as the one used above: MNP-INAP With Optional Voice Mail Inter-working.

An Output Address includes the triple (NoAI, Numbering Plan, Digit String). The Output Digit String Configuration Table specifies the necessary output digit strings of the SAS Application Service, including a NoAI value. The value for Numbering Plan is implicitly present in the service logic of the SAS Application Service. Memory has to be allocated for the digit string elements of the Output Digit String Configuration Table, plus for Nat1 and Nat2 or Nat.

The SAS Application Service Specific Outbound Processing Configuration Table for Normal and Abnormal Completion contains up to 10 Response Actions. One or more of these Response Actions can be used to insert configured values at defined positions in the output digit string. This service used the following response actions: INAP Continue, INAP Connect, INAP ReleaseCall and INAP Return Error.

Within the Connect message the parameters 'Include Cut And Paste' are configurable. Depending on a configurable parameter Connect message can be send either to original or alternate number. Depending on a configurable parameter the routing number can be included or send as a parameter. The alternate number is configured by number, Nature Of Address and Numbering Plan. If the Connect message to original number is sent the configurable flag Send Charging Information is evaluated, too.

An error code is configurable as parameter of the Return Error message depending on the database result. For each database result another Return Error Code can be configured.

TABLE 6

Definition of the Output Digit String Configuration Table for the Example.
Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| MNP-INAP-O-VM-IW | 1 | INRN | Subscriber | Modified Input | Prefix-0 |
| MNP-INAP-O-VM-IW | 1 | Nat1 | Subscriber | Copy Input | Nat1 |
| MNP-INAP-O-VM-IW | 1 | VMSC-INI | Subscriber | Copy Input | Infix-0 |
| MNP-INAP-O-VM-IW | 1 | Nat2 | Subscriber | Copy Input | Nat2 |

TABLE 7

Output Digit String To Protocol Element Mapping Table for Table.
Output Digit String To Protocol Element Mapping Table

| SAS Application Service Id | Output Digit String Id | Protocol Element Id | Output Digit String Option |
|---|---|---|---|
| MNP-INAP-O-VM-IW | 1 | INAP Connect DRA | 1 |

TABLE 8

Input Digit String To Output Digit string Mapping Table for Table.
Input Digit String To Output Digit String Mapping Table

| SAS Application Service Id | Output Digit String Id | Input Digit String Id |
|---|---|---|
| MNP-INAP-O-VM-IW | 1 | 1 |
| MNP-INAP-O-VM-IW | 1 | 2 |
| MNP-INAP-O-VM-IW | 1 | 3 |
| MNP-INAP-O-VM-IW | 1 | 4 |

If a Release Call message is sent a Release Cause depending on the database result can be configured. For each database result another Release Cause can be configured.

There are eight configurable outbound actions for this Service Handler:

Return TCAP Error with configurable Error Code.

INAP Release Call with configurable Cause.

INAP Continue.

INAP Connect either with
- DRA from SAS Database, Cut&Paste configurable present or not.
- DRA from predefined configured value, Cut&Paste configurable present or not.

INAP SendChargingInformation, with configurable values for parameters performChargeDetermination and sendingSideID. The INAP SCI can only be sent in combination with the INAP Connect in a separate TCAP Component.

Concatenate with other Service Handler.

Discard Message.

Store Message in local SAS file.

TABLE 9

Definition of the SAS Application Service Specific Outbound Processing Configuration
Table for the Example—Normal Completion.
SAS Application Service Specific Outbound Processing Configuration Table—
Normal Completion

| SAS Application Service Id | Number Type | Portability Status | Response Action Id1 | Service Control Data Slot Id | Output Digit String Id | Nature of Address Indicator |
|---|---|---|---|---|---|---|
| MNP-INAP-O-VM-IW | MSISDN | ONNPO | Send INAP Continue Operation | None. | None. | NULL |
| MNP-INAP-O-VM-IW | MSISDN | ONPO | Send INAP Connect Operation | 0 [INRN] | 1 | Subscriber |
| MNP-INAP-O-VM-IW | MSISDN | FNPI | Send INAP Connect Operation | 0 [INRN] | 1 | Subscriber |
| MNP-INAP-O-VM-IW | MSISDN | FNP2AFN | Send INAP Connect Operation | 0 [INRN] | 1 | Subscriber |
| MNP-INAP-O-VM-IW | MSISDN | FNNK2BP | Send INAP Connect Operation | 0 [INRN] | 1 | Subscriber |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

TABLE 10

Definition of the SAS Application Service Specific Outbound Processing
Configuration Table for the Example—Abnormal Completion.
SAS Application Service Specific Outbound Processing Configuration Table—
Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| MNP-INAP-O-VM-IW | NO MATCH | Send INAP Continue Operation | None. | None. | NULL |
| MNP-INAP-O-VM-IW | AMBIGOUS | Send INAP RRB Operation | Send INAP CI Operation | None | NULL |
| MNP-INAP-O-VM-IW | Error1 | Send INAP Release Cause Operation | Release Call Cause n | None. | NULL |

Configuration Data:

Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 12 presents the information necessary to specify an input digit string. Table 13 specifies the mapping between the Input Digit String to the Output Digit String. Table 14 specifies the mapping between the Output Digit String and the Protocol Element.

TABLE 11

Details of the Loop Detection Status Configuration Table
Loop Detection Status And Action Configuration Table

| Attribute | Format | Values | Description |
|---|---|---|---|
| SAS Application Service Id | 2 Byte | Any valid SAS Application Service Id | Primary Key. |
| SAS Database Id | 2 Byte | Any valid SAS Database Id. | Primary Key. |

TABLE 11-continued

Details of the Loop Detection Status Configuration Table
Loop Detection Status And Action Configuration Table

| Attribute | Format | Values | Description |
|---|---|---|---|
| SAS Database Table Id | 2 Byte | Any valid SAS Database Table Id. | Primary Key. |
| Number Type | 1 Byte | Any valid encoding of Number Type | Primary Key. |
| Portability Status | 1 Byte | Any valid encoding of Portability Status | Primary Key. |
| Loop Detection State and Action | 1 Byte | Any valid encoding of Loop Detection State and Action | Possible values are "Disabled", "Enabled: Discard Message", etc. |

A single output digit sting shall be able to be selected—based on its Id—from a set of possible output digit strings. The selection is done based on the value combination of (E.164/MSIN Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. The same principle can in the future be applied to other number parts as well.

It shall be possible to specify which action is to be done in the outbound digit processing depending on the value combination of (E.164 Number Type, Portability Status). Possible actions are the type of message to be used, etc. A table has to be present to specify this configuration data. The same principle can in the future be applied to other number parts as well.

Table 15 contains the application specific outbound processing in case an entry was found in the Single Number or Range Number Table. However, it is possible that no entry is found in both tables. This abnormal outbound processing is contained in Table 16.

TABLE 12

Details of the Output Digit String Configuration Table
Output Digit String Configuration Table

| Attribute | Format | Values | Description |
|---|---|---|---|
| SAS Application Service Id | 2 Byte | Any valid SAS. Application Service Id | Primary Key. |
| Output Digit String Id | 3 Byte | Any valid Input Digit String Id | Primary Key. SAS Application Service specific encoding. Multiple output digit strings per Protocol Element are possible. If multiple output digit strings are specified, then usage of each output digit string may be associated with a specific condition. It is a matter of the SAS Application Service how the association of a condition is mapped to a specific output digit string. |
| Auxiliary Number Name | 1 Byte | Any valid encoding of Service Control Data Type E.g. SI, CC, INRN, OwnINRN, VMSC-INP, SMSC-INP, VMSC-INI, SMSC-INI, P, MCC, MNC, NC, GAC, EC, Nat1, NDC, Nat2, SN, BigCore, NotAllowed, Opaque. | Primary Key. An output digit string is defined by the explicit list of its Head parts, the BigCore and its Tail parts, identified by the respective names listed in the encoding of the common mnemonics encoding of the Service Control Data Type and the Auxiliary Number Name. It is possible in the Output Digit String, that any part from the Input, Digit String can be explicitly manipulated by the service logic. The encoding of this attribute has to be in common with the attribute Auxiliary Number Name and the attribute Service Control Data Type. The various types of Auxiliary Numbers and Core Part Numbers—identified by their Name—have the following structure (as far as known today): CC: 1–3 hex digits. All others have 1 or more hex digits, depending on the customer's network. A particular meaning has the following value: NotAllowed: If an Auxiliary Number has this name, then the respective Output Digit String for a particular NoAI value is not allowed. The Auxiliary Number Presence is Always in this case, and the Auxiliary Number Position is Head-0. The Output Digit String must consist of this Auxiliary item only. Opaque: If an Auxiliary Number has this name, then the respective Output Digit String for a particular NoAI value will consist of a value derived from the Service Control Data Table as a replacement value. No structure of the Output Digit String needs to be known in this case. The Output Digit String must consist of this Auxiliary Item only, in position Head-0. The value "Not Allowed" is necessary, even in the combination with the Allowed Values of NoAI Configuration Table Reason: there may be more than one option of output digit string for a given NoAI value, and in each option the allowed digit strings for a given NoAI value differ. |

TABLE 12-continued

Details of the Output Digit String Configuration Table
Output Digit String Configuration Table

| Attribute | Format | Values | Description |
|---|---|---|---|
| | | | Purpose of the parameter for the service logic of the SAS Application Service. This unique name is used to define each entity in the outbound digit string. The relationship between corresponding entities in the input digit string and the output digit string is defined on the basis of the Auxiliary Number Name. |
| Nature of Address Indicator | 1 Byte | Any valid protocol specific encoding of the Nature of Address Indicator. | A NoAI value may be associated with a structure definition of an output digit string. NoAI in protocols has up to 7 bit for its encoding. Therefore, the value FFh is used as NULL value for this attribute, which means that no NoAI value is associated with this particular output digit string. |
| Translation Type Control | 1 Byte | Use, Do Not Use | This attribute indicates whether or not the Translation Type shall be used in the specified Output Digit String. |
| Translation Type | 1 Byte | Any valid protocol specific encoding of the Translation Type | A Translation Type value may be associated with a structure definition of an output digit string. |
| Auxiliary Number Presence | 1 Byte | Copy From Input, Modify Input With Service Control, Always as New Element From Service Control, Sometimes as New Element From Service Control, Always as New Element From Static Configuration. | The presence of the auxiliary number. For the output digit string, the semantics is as follows: Copy From Input: Copy from corresponding input digit string element. If the corresponding input digit string element was actually not present, this output digit string element is empty. Modify Input With Service Control: Modification of the corresponding input digit string element. The modification is controlled by the respective Service Control Data item in combination with the pair (Number Type, Portability Status) of the found entry in the Single Number or Range Number table. Always as New Element From Service Control: Always present as a new element, which was not yet present in the input digit string. The value is derived from the respective Service Control Data item, possibly in combination with the pair (Number Type, Portability Status) of the found entry in the Single Number or Range Number table. If an Auxiliary Number which is specified to be Always present as a mew element, is not actually present, an error has to be reported. Sometimes as New Element From Service Control: Sometimes present as a new element, which was not yet present in the input digit string. The value is derived from the respective Service Control Data item, possibly in combination with the pair (Number Type, Portability Status) of the found entry in the Single Number or Range Number table. Always as New Element From Static Configuration: Always present as a new element, which was not yet present in the input digit string. The value is derived from static configuration data for this particular SAS Application Service. Purpose of this parameter for the service logic of the SAS Application Service: this attribute allows to generate an error, if an Always present optional digit string is not present in the output digit string. |
| Auxiliary Number Position | 1 Byte | Any valid encoding of Auxiliary Number Position. | Possible values are Head-0 to Prefix-31, and Tail-0 to Tail-31. Purpose of this parameter for the service logic of the SAS Application Service: specifies the correct position of this entity in the output digit strings. |

Note:
An empty table for a given output digit string is not allowed, at least Opaque or something similar has to be specified.
Note:
A SAS Application Service accesses an Output Digit String by means of the following four key attributes: SAS Application Service Id, Protocol Element Id, Input Digit String Id, Nature of Address Indicator. The key attribute Auxiliary Number Name does not need to be used as it specifies the respective Auxiliary Numbers in the output digit string.
Note:
For each Input Digit String, which might be used in an Output Digit String, there has to be a dedicated definition of Output Digit String. It can be possible, that the one and the some structure of Output Digit String is defined for multiple Input Digit Strings.

TABLE 13

Details of the Input Digit String To Output Digit String Mapping Table
Input Digit String To Output Digit String Mapping Table

| Attribute | Format | Values | Description |
|---|---|---|---|
| SAS Application Service Id | 2 Byte | Any valid SAS Application Service Id | Primary Key. |

TABLE 13-continued

Details of the Input Digit String To Output Digit String Mapping Table
Input Digit String To Output Digit String Mapping Table

| Attribute | Format | Values | Description |
|---|---|---|---|
| Output Digit String Id | 3 Byte | Any valid Input Digit String Id | Primary Key. SAS Application Service specific encoding. Multiple output digit strings per Protocol Element are possible. If multiple output digit strings are specified, then usage of each output digit string may be associated with a specific condition. It is a matter of the SAS Application Service how the association of a condition is mapped to a specific output digit string. |
| Input Digit String Id | 3 Byte | Any valid Input Digit String Id | Foreign Key to the Input Digit String from which this Output Digit String is provided with values. SAS Application Service specific encoding. Only one Input Digit String per Output Digit String is possible. |

Note:
the relationship between Input Digit String and Output Digit String is many-to-many.

TABLE 14

Details of the Input Digit String To Protocol Element Mapping Table
Output Digit String To Protocol Element Mapping Table

| Attribute | Format | Values | Description |
|---|---|---|---|
| SAS Application Service Id | 2 Byte | Any valid SAS Application Service Id | Primary Key. |
| Output Digit String Id | 3 Byte | Any valid Input Digit String Id | Primary Key. SAS Application Service specific encoding. Multiple output digit strings per Protocol Element are possible. If multiple output digit strings are specified, then usage of each output digit string may be associated with a specific condition. It is a matter of the SAS Application Service how the association of a condition is mapped to a specific output digit string. |
| Protocol Element Id | 3 Byte | Any valid Protocol Element Id | SAS Application Service specific encoding. A protocol element is for instance a parameter of a service primitive. For a given protocol element one or more output digit strings are possible. |
| Output Digit String Option | 1 Byte | Positive Integer | The sequence number of the Output Digit String Option. For each protocol element, it is possible to define multiple Output Digit Strings. |

TABLE 15

Details of the SAS Application Service Specific Outbound Processing
Configuration Table—Normal Completion
SAS Application Service Specific Outbound Processing
Configuration Table—Normal Completion

| Attribute | Format | Values | Description |
|---|---|---|---|
| SAS Application Service Id | 2 Byte | Any valid SAS Application Service Id | Primary Key. |
| Number Type | 1 Byte | Any valid encoding of Number Type | Primary Key. |
| Portability Status | 1 Byte | Any valid encoding of Portability Status | Primary Key. |
| Inbound NoAI Value | 2 Byte | Any valid encoding of NoAI plus FFFFh for ignoring this attribute. | Primary Key. Some SAS Application Services need to take the NoAI value of the Inbound Address into account to determine the Outbound Action. The NoAI value to be used here is the one of this Inbound Address for which the database search in the Service Decision phase was done. If this attribute is to be ignored during Outbound Processing, it has to be filled with FFFFh |
| Response Action Id 1 | 3 Byte | Any valid Response Action | Encoding is SAS Application Service specific. NULL value is FFh. |
| Response Action Id 2 | 3 Byte | Any valid Response Action | Encoding is SAS Application Service specific. NULL value is FFh. |
| Response Action Id 3 | 3 Byte | Any valid Response Action | Encoding is SAS Application Service specific. NULL value is FFh. |
| Response Action Id 4 | 3 Byte | Any valid Response Action | Encoding is SAS Application Service specific. NULL value is FFh. |
| Response Action Id 5 | 3 Byte | Any valid Response Action | Encoding is SAS Application Service specific. NULL value is FFh. |
| Response | 3 Byte | Any valid Response Action | Encoding is SAS Application Service specific. NULL value is FFh. |

TABLE 15-continued

Details of the SAS Application Service Specific Outbound Processing
Configuration Table—Normal Completion
SAS Application Service Specific Outbound Processing
Configuration Table—Normal Completion

| Attribute | Format | Values | Description |
|---|---|---|---|
| Action Id 6 Response | 3 Byte | Any valid Response Action | Encoding is SAS Application Service specific. NULL value is FFh. |
| Action Id 7 Response | 3 Byte | Any valid Response Action | Encoding is SAS Application Service specific. NULL value is FFh. |
| Action Id 8 Response | 3 Byte | Any valid Response Action | Encoding is SAS Application Service specific. NULL value is FFh. |
| Action Id 9 Response | 3 Byte | Any valid Response Action | Encoding is SAS Application Service specific. NULL value is FFh. |
| Action Id 10 Service Control Data Slot Id | 1 Byte | Any valid encoding of Service Control Data Slot Id | |
| Output Digit String Id | 3 Byte | Any valid Input Digit String Id | Partial foreign key into the Structure of Output Digit String Configuration Table. SAS Application Service specific encoding. Multiple output digit strings per Protocol Element are possible. |
| Nature of Address Indicator | 1 Byte | Any valid protocol specific encoding of the Nature of Address Indicator. | Partial foreign key into the Structure of Output Digit String Configuration Table. NoAI in protocols has up to 7 bit for its encoding. Therefore, the value FFh is used as NULL value for this attribute. Per input digit string, the NoAI has to be considered. Therefore, per Input Digit String Id, multiple NoAIs are possible. For each NoAI of an Input Digit String Id, an input digit string has to be defined. |

Handling of NoAI values in the outbound processing: the NoAI value of the output digit string can be determined from the following four sources:
1. The input digit string corresponding to the output digit string,
2. The selected entry of the Service Control Data table,
3. The output digit string, or
4. The SAS Application Service Specific Outbound Processing Configuration Table—Normal Completion (this table). The NoAI in this table overrules the other three. If the NoAI value in this table is NULL, then the NoAI value of the selected output digit string has to be used. If the NoAI value of the selected output digit string is NULL, then the NoAI value of the-selected entry of the Service Control Data Table has to be used. If this entry does not support a NoAI value, then NoAI value of the corresponding input digit string has to be used.

TABLE 16

Details of the SAS Application Service Specific Outbound Processing
Configuration Table—Abnormal Completion
SAS Application Service Specific Outbound Processing
Configuration Table—Abnormal Completion

| Attribute | Format | Values | Description |
|---|---|---|---|
| SAS Application Service Id | 2 Byte | Any valid SAS Application Service Id | Primary Key. |
| SAS Application Specific Abnormal Condition Id | 3 Byte | Any valid encoding of SAS Application Specific Abnormal Condition Id | Primary Key. Currently, the following possible values are defined: Number Not Found: i.e. the extracted received number was not found the Single Number Table nor in the Range Number Table. SAS Database Error: this is any kind of SAS database error The outbound handling in this case will similar to the one of Number Not Found. In addition an error report will be generated in order to trigger corrective action for the database. |
| Response Action Id 1 | 3 Byte | Any valid Response Action | Encoding is SAS Application Service specific. NULL value is FFh. |
| Response Action Id 2 | 3 Byte | Any valid Response Action | Encoding is SAS Application Service specific. NULL value is FFh. |
| Response Action Id 3 | 3 Byte | Any valid Response Action | Encoding is SAS Application Service specific. NULL value is FFh. |
| Response Action Id 4 | 3 Byte | Any valid Response Action | Encoding is SAS Application Service specific. NULL value is FFh. |
| Response Action Id 5 | 3 Byte | Any valid Response Action | Encoding is SAS Application Service specific. NULL value is FFh. |
| Response Action Id 6 | 3 Byte | Any valid Response Action | Encoding is SAS Application Service specific. NULL value is FFh. |
| Response Action Id 7 | 3 Byte | Any valid Response Action | Encoding is SAS Application Service specific. NULL value is FFh. |
| Response | 3 Byte | Any valid Response Action | Encoding is SAS Application Service specific. NULL value is FFh. |

TABLE 16-continued

Details of the SAS Application Service Specific Outbound Processing
Configuration Table—Abnormal Completion
SAS Application Service Specific Outbound Processing
Configuration Table—Abnormal Completion

| Attribute | Format | Values | Description |
|---|---|---|---|
| Action Id 8 Response | 3 Byte | Any valid Response Action | Encoding is SAS Application Service specific. NULL value is FFh. |
| Action Id 9 Response | 3 Byte | Any valid Response Action | Encoding is SAS Application Service specific. NULL value is FFh. |
| Action Id 10 Output Digit String Id | 3 Byte | Any valid Input Digit String Id | Partial foreign key into the Structure of Output Digit String Configuration Table. SAS Application Service specific encoding. Multiple output digit strings per Protocol Element are possible. |
| Nature of Address Indicator | 1 Byte | Any valid protocol specific encoding of the Nature of Address Indicator. | Partial foreign key into the Structure of Output Digit String Configuration Table. NoAI in protocols has up to 7 bit for its encoding. Therefore, the value FFh is used as NULL value for this attribute. Per input digit string, the NoAI has to be considered. Therefore, per Input Digit String Id, multiple NoAIs are possible. For each NoAI of an Input Digit String Id, an input digit string has to be defined. |

Handling of NoAI values in the outbound processing: the NoAI value of the output digit string can be determined from the following four sources:
1. The input digit string corresponding to the output digit string,
2. The selected entry of the Service Control Data table,
3. The output digit string, or
4. The SAS Application Service Specific Outbound Processing Configuration Table—Abnormal Completion (this table). The NoAI in this table overrules the other three. If the NoAI value in this table is NULL, then the NoAI value of the selected output digit string has to be used. If the NoAI value of the selected output digit string is NULL, then the NoAI value of the-selected entry of the Service Control Data Table has to be used. If this entry does not support a NoAI value, then NoAI value of the corresponding input digit string has to be used.
In general, the following kinds of response actions are obvious:
Return Message to Sender.
Return Error to Sender.
Forward Message to the Recipient to whom it would be routed without intervention of SAS.
Forward Message to configured Recipient.
Discard Message.

Figure 7:
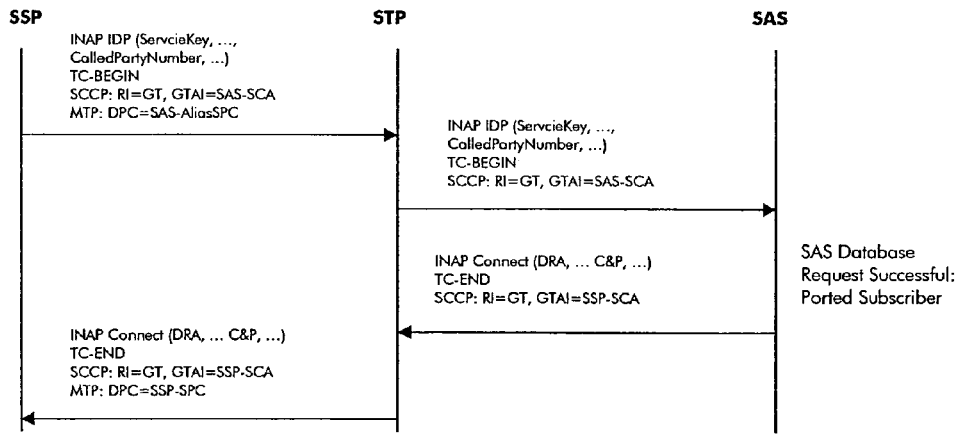
FIG. 7 shows a diagram of a query response scenario.

Scenarios:

FIG. 7 shows a Query Response Scenario.

Figure 8:
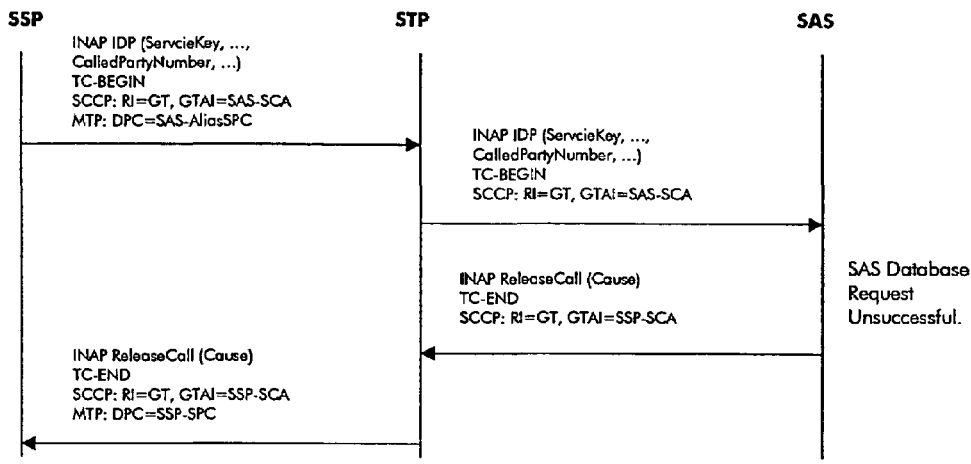
FIG. 8 shows a diagram of a further query response scenario.

FIG. 8 shows a further Query Response Scenario (Unsuccessful) With INAP Release Call.

Figure 9:
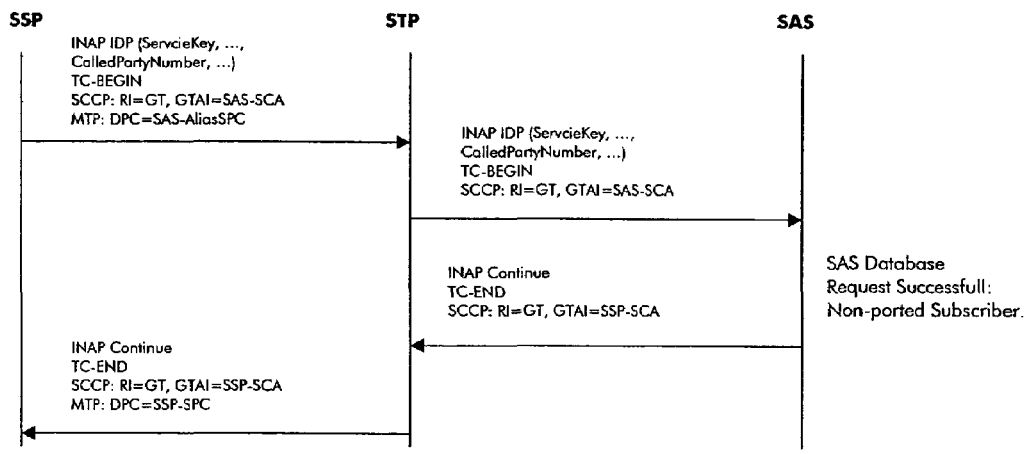
FIG. 9 shows a diagram of a further query response scenario.

FIG. 9 shows a further Query Response Scenario (Unsuccessful) With INAP Continue.

Figure 10:
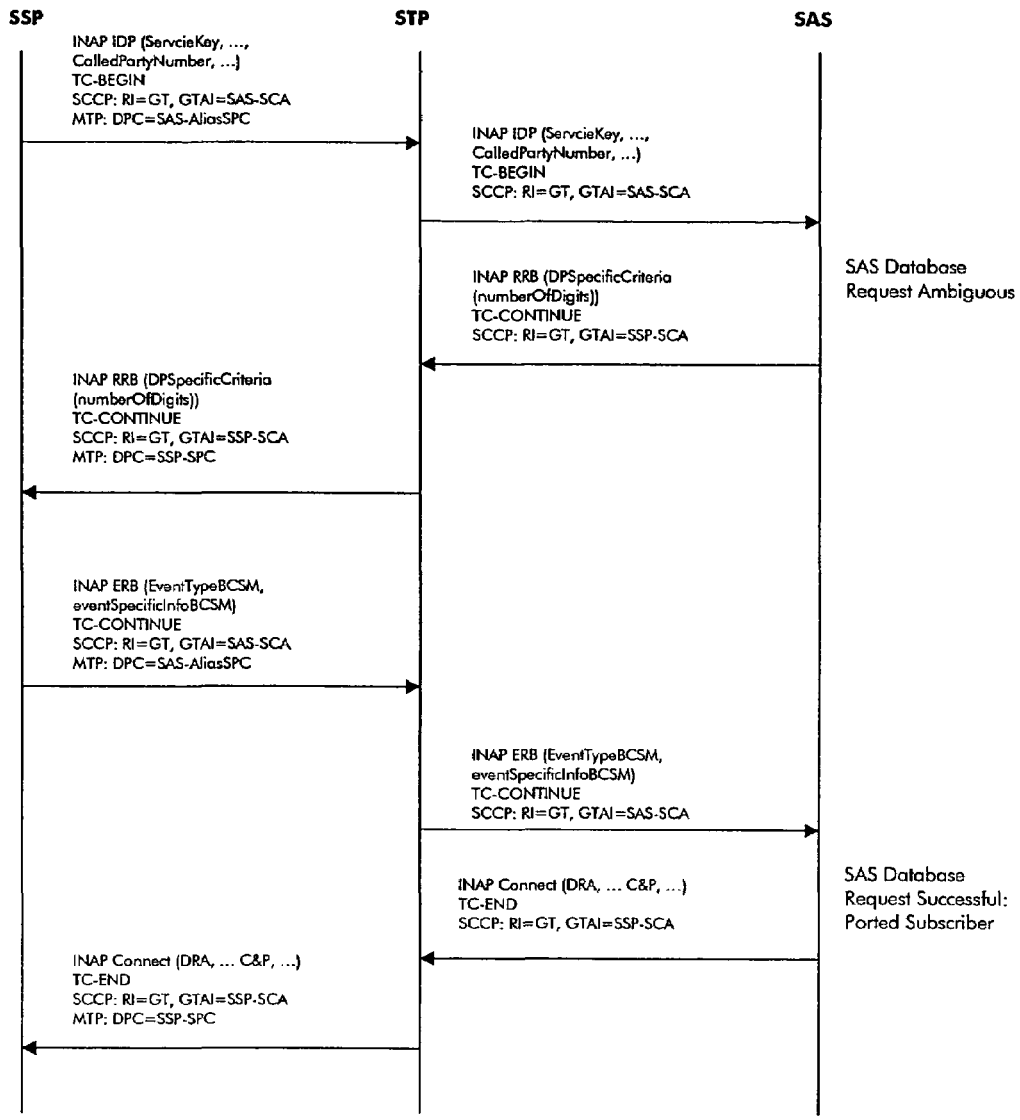
FIG. 10 shows a diagram of a call steering scenario.

FIG. 10 shows a Call Steering Scenario (Digit Request).

Figure 11:
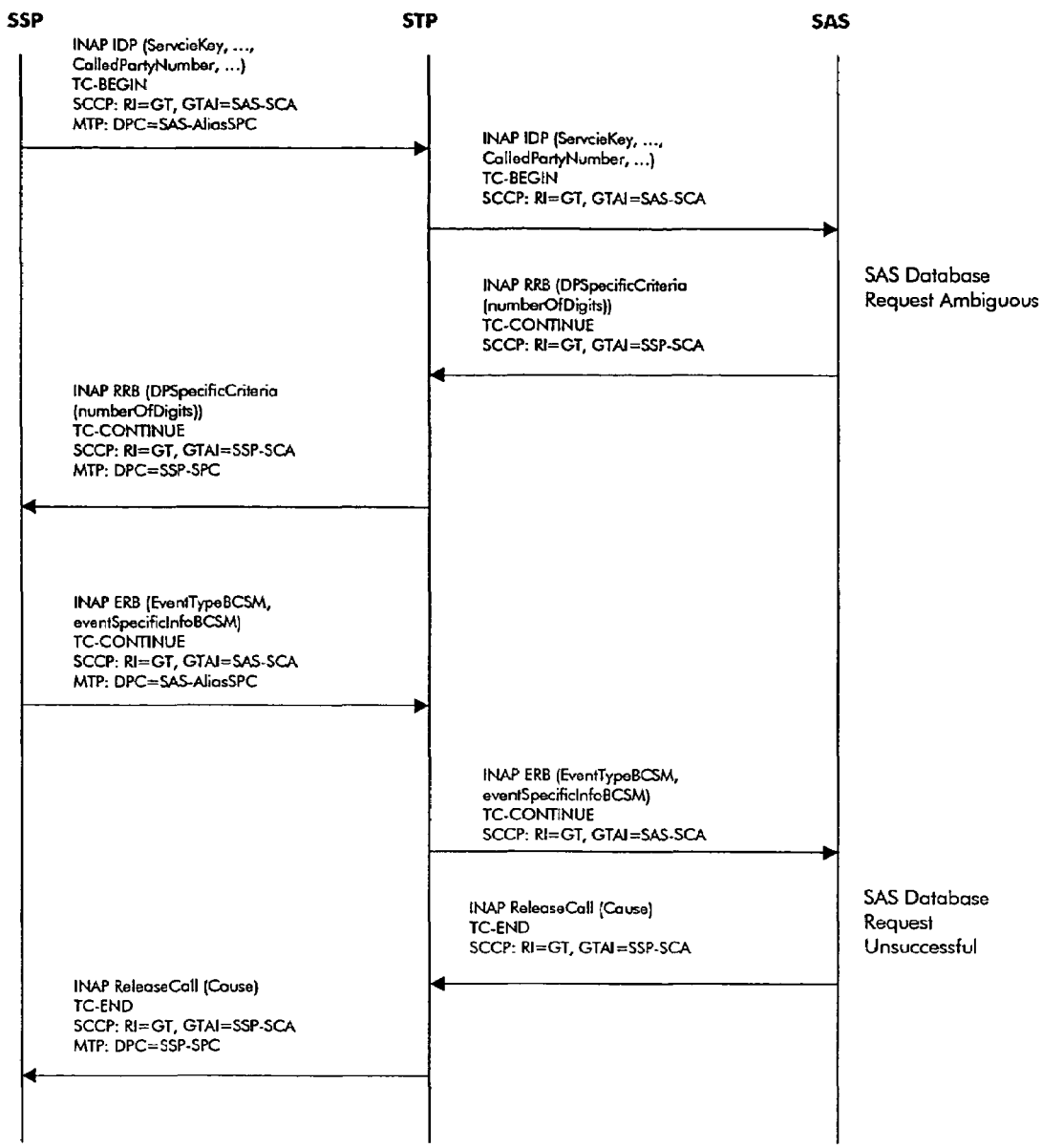
FIG. 11 shows a diagram of a further call steering scenario.

FIG. 11 shows a further Call Steering Scenario (Digit Request Unsuccessful) With INAP Release Call.

Figure 12:
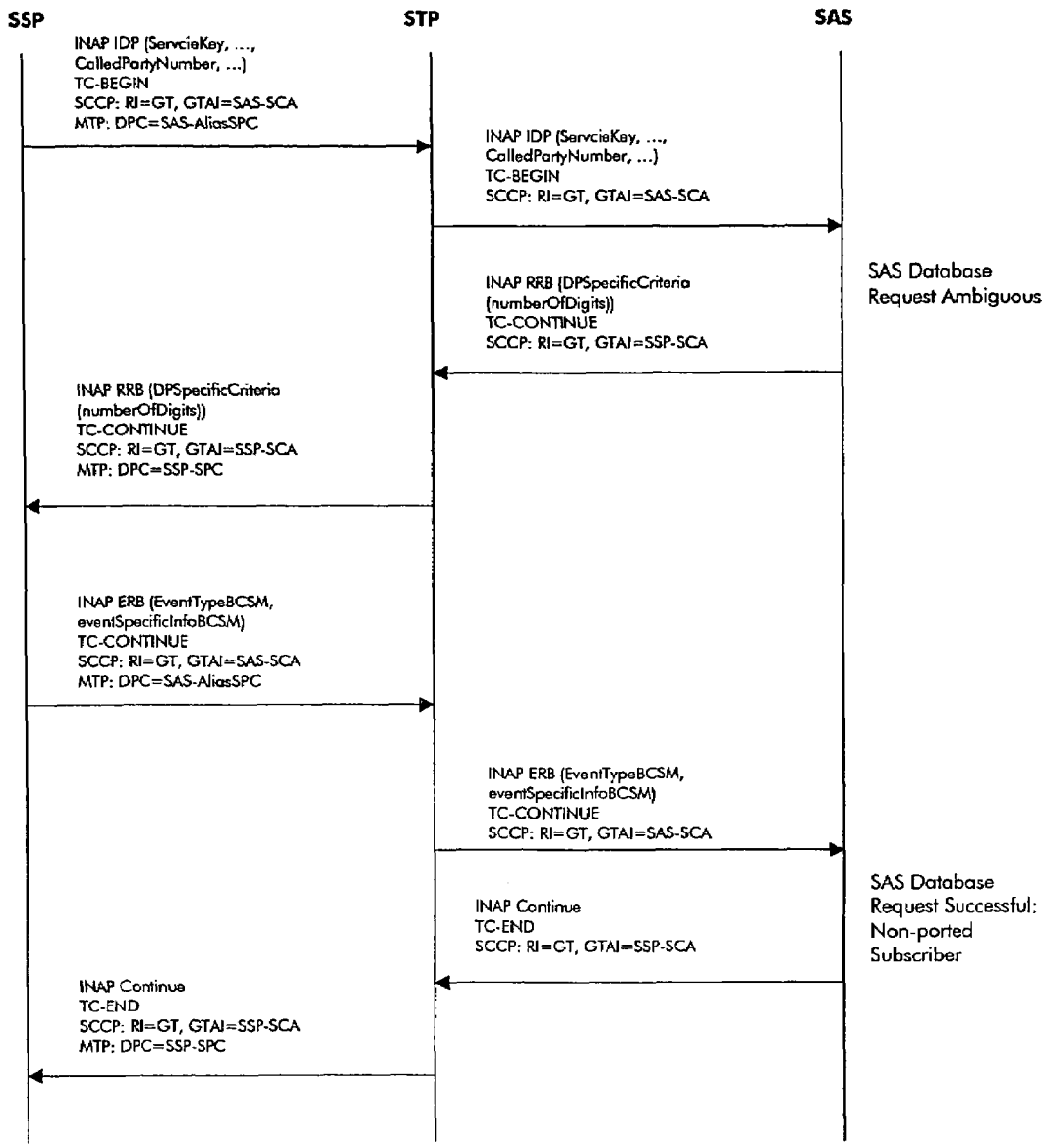
FIG. 12 shows a diagram of a further call steering scenario.

FIG. 12 shows a further Call Steering Scenario (Digit Request Unsuccessful)
With INAP Continue.

Second Embodiment of the Invention

SRI Terminating Number Portability

Short Description:

This service encompasses SRI terminating NP (SRI=Send Routing Information, NP=Number Portability) with optionally voice mail for a mobile network. The service is highly configurable.

The second and all further embodiments of the inventions are described using partly the some figures and tables as used for the first embodiment.

FIG. 1 depicts the SDL diagram of the Generic Structure of a SAS Application Service.

The SRI terminating service handles the SRI (Send Routing Information) message of the MAP (Mobile Application Part) protocol. Of the incoming message, the parameter 'MSISDN' is analysed. The MSISDN may or may not contain a voice mail infix, this is configurable. The service terminates the SRI message according to its configuration by an SRI Response message, a TCAP Error, a TCAP Reject or by discarding the request. In the SRI Response message, the parameters Roaming Number and IMSI are set. The IMSI is set to a fixed, configurably default IMSI (an IMSI must be present as per the MAP standard).

An instance of the SRI Terminating service can either work together with an instance of the SRF service (Mobile SCCP routing) or work stand-alone.

A typical case for numbers with voice mail infix is that the SRI Terminating service instance handles all requests by sending an appropriate SRI response.

Alternatively—typically for numbers without voice mail infix—, the SRF service instance handles requests that stay in the own network by relaying the request to the appropriate HLR, while it forwards requests that require a foreign network to the SRI Terminating service. The SRI Terminating service instance handles these requests by terminating them with an appropriate SRI Response.

Multiple instances of the SRI Terminating service with different configurations can run inside the SAS in parallel.

The three stages are described in detail as follows:

Stage 1—Inbound Message Analysis: This stage starts with some service specific inbound protocol checks. The SRI Terminating service checks that the MSISDN parameter is present and that it contains digits (otherwise a TCAP Reject is sent) and that the NoA (Nature of Address) is recognized (otherwise a TCAP Error is sent). Depending on the NoA a specific analysis string is chosen. That analysis string describes which auxiliary number parts are mandatory or optionally. Then the auxiliary number parts are analysed. If found and correct, then remove auxiliary number part from received E.164 or MSIN Based number and store it internally. This analysis is done step by step for each possible auxiliary number part. When the analysis of the auxiliary number parts terminates successfully, then the second stage starts. Each auxiliary number part is to be stored in a record containing its name, its position, its value, and its presence. Inbound Processing is configured based on the specification of the received digit string and other application service specific configuration items.

Stage 2—Service Decision: Analyse the core part of the received number in the Single Number and Range Number tables. The Extended Match Indicator is to be used if required. Service Decision includes also Loop Detection. The Service Decision is executed dependent on configuration data items and the Transition Indicator, the Default/Exception Indicator, and the Single Number Flag of the Single Number and Range Number tables.

Stage 3—Outbound Message Synthesis: Depending on the result of this database query and the inbound processing, the response is generated. Outbound processing is configured based on the specification of the digit string to be sent off, the Service Control Data Record, the Number Type and the Portability Status, and other configuration data items. The SRI terminating service ensures that the length of the resulting Roaming Number does not exceed the limit specified in the used protocol version/variant. Otherwise, a TCAP Error is sent.

FIG. 2 shows Inbound Address Analysis and Inbound Digit Analysis.

FIG. 3 shows Service Decision.

For those SAS Application Services that are required to search the E.164 or MSIN Based Tables for routing information, the following principles apply. The search of the E.164 or MSIN Based Tables constitutes the main service decision. Figure depicts the SDL diagram of the Service Decision.

The Evaluation of Database Search Indications is a SAS Application Service specific matter, also the decision whether or not to perform another SAS Database search. The Application Specific Evaluation of Database Search Indications may include for instance actions like requesting additional digits in case the database search came back with an indication that the queried number was AMBIGUOUS. Both, the application specific evaluations and the decision for further database searches, depend on the SAS Application Service's service logic, configurable items such as "Open/Closed Numbering Plan", "Block/Single Number Dialling", "Request More Digits Yes/No", and other things.

The SRI Terminating service never requests additional digits because this is neither possible nor necessary in the MAP protocol. The MSISDN parameter always contains all digits. If the database search indicates AMIGUOUS, the SRI Terminating service treats this as a database error.

Loop Detection is a mechanism to discover inconsistencies in the received data, which might be caused by a condition that causes the SS7 message to loop through the SS7 network. There are two kinds of loop detection: a generic one and an application specific one. The generic one is specified in detail here. The applications specific ones are specified at the respective SAS Application Services.

FIG. 4 shows a Database Search in E.164 and MSIN Based Single Number and Range Number Tables.

Table 1 shows an E.164 Single Number Table for the Example.

Table 2 shows an E.164 Range Number Table for the Example.

Table 3 shows a Service Control Data Table for the Example.

Table 4 shows an Auxiliary Number Table for the Example.

Detection of Loops

Loop detection is provided to prevent signalling loops within the signalling network. Signalling loops may occur when the routing databases in different signalling networks contain inconsistent routing information for network subscribers. The ability to detect signalling loops is defined within the scope of each SAS Application Service and may not be present in all SAS Application Services. Also, the response taken to the detection of a signalling loop is defined within the scope of each SAS Application Service.

As stated above, there is a Generic Loop Detection mechanism, which applies to many SAS Application Service, and there are SAS Application Service specific Loop Detection mechanisms. The Generic Loop Detection mechanism is in detail specified here.

There is no application specific Loop Detection mechanisms in the SRI terminating service. Only the Generic Loop Detection is executed.

Generic Loop Detection Analysis

The generic mechanism for the detection of signalling loops is a two step process and requires the co-operation of the underlying switched network in order to succeed. First, the underlying switched network will pass any received Inter-Network Routing Number to the SAS as part of the concerned address (i.e. the SCCP Called Party Address GTAI). This first step signals the SAS Loop Detection algorithm that the signalling message has originated outside of the current signalling network. Secondly, the E.164 database(s) search must resolve to a combination of the pair (E.164 Number Type, Portability Status) that is marked as a candidate for looping. With these two criteria met, the signalling loop is detected.

This implies, that there has to be configuration table which indicates for each pair (E.164 Number Type, Portability Status), whether loop detection is to be enabled or not.

As a temporary relaxation of the SAS Loop Detection, the Transition Time capability was introduced. This provides a synchronisation period for recent database updates. If the Transition Indicator is marked "Transition Time is not yet over", then the SAS Loop Detection is either bypassed or relaxed.

FIG. 5 shows a Generic Loop Detection Analysis.

TABLE 17

Loop Detection Status And Action Configuration Table for the Example.

| SAS Application Service Id | SAS Database Id | SAS Database Table Id | Number Type | Portability Status | Loop Detection State And Action |
|---|---|---|---|---|---|
| MNP-SRIt-O-VM-IW | MNP E. 164 Database 0 | E. 164 Single Number Table | MSISDN | ONNPO | Disabled |
| MNP-SRIt-O-VM-IW | MNP E. 164 Database 0 | E. 164 Single Number Table | MSISDN | ONPO | Discard, Counter |
| MNP-SRIt-O-VM-IW | MNP E. 164 Database 0 | E. 164 Single Number Table | MSISDN | FNPI | Discard, Counter |
| MNP-SRIt-O-VM-IW | MNP E. 164 Database 0 | E. 164 Single Number Table | MSISDN | FNP2AFN | Discard, Counter |
| MNP-SRIt-O-VM-IW | MNP E. 164 Database 0 | E. 164 Single Number Table | MSISDN | FNNK2BP | Disabled |
| MNP-SRIt-O-VM-IW | MNP E. 164 Database 0 | E. 164 Range Number Table | MSISDN | ONNPO | Discard, Counter |
| MNP-SRIt-O-VM-IW | MNP E. 164 Database 0 | E. 164 Range Number Table | MSISDN | ONPO | Disabled |
| MNP-SRIt-O-VM-IW | MNP E. 164 Database 0 | E. 164 Range Number Table | MSISDN | FNPI | Disabled |
| MNP-SRIt-O-VM-IW | MNP E. 164 Database 0 | E. 164 Range Number Table | MSISDN | FNP2AFN | Disabled |
| MNP-SRIt-O-VM-IW | MNP E. 164 Database 0 | E. 164 Range Number Table | MSISDN | FNNK2BP | Discard, Counter |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

FIG. 6 shows Generic Aspects of Outbound Message Synthesis.

Configuration tables control Outbound Message Synthesis. The configuration tables of the Outbound Message Synthesis are illustrated by an example. The SAS Application Service is the same as the one used above: MNP-SRIt With Optional Voice Mail Inter-working.

An Output Address includes the triple (NoAI, Numbering Plan, Digit String). The Output Digit String Configuration Table specifies the necessary output digit strings of the SAS Application Service, including a NoAI value. The value for Numbering Plan is implicitly present in the service logic of the SAS Application Service. Memory has to be allocated for the digit string elements of the Output Digit String Configuration Table, plus for Nat1 and Nat2 or Nat.

TABLE 18

Definition of the Output Digit String Configuration Table for the Example.
Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| MNP-SRIt-O-VM-IW | 1 | INRN | Subscriber | Modified Input | Prefix-0 |
| MNP-SRIt-O-VM-IW | 1 | Nat1 | Subscriber | Copy Input | Nat1 |
| MNP-SRIt-O-VM-IW | 1 | VMSC-INI | Subscriber | Copy Input | Infix-0 |
| MNP-SRIt-O-VM-IW | 1 | Nat2 | Subscriber | Copy Input | Nat2 |

TABLE 19

Output Digit String To Protocol Element Mapping Table for Table 18.
Output Digit String To Protocol Element Mapping Table

| SAS Application Service Id | Output Digit String Id | Protocol Element Id | Output Digit String Option |
|---|---|---|---|
| MNP-SRIt-O-VM-IW | 1 | SRIres roaming number | 1 |

TABLE 20

Input Digit String To Output Digit string Mapping Table 18.
Input Digit String To Output Digit String Mapping Table

| SAS Application Service Id | Output Digit String Id | Input Digit String Id |
|---|---|---|
| MNP-SRIt-O-VM-IW | 1 | 1 |
| MNP-SRIt-O-VM-IW | 1 | 2 |

TABLE 20-continued

Input Digit String To Output Digit string Mapping Table 18.
Input Digit String To Output Digit String Mapping Table

| SAS Application Service Id | Output Digit String Id | Input Digit String Id |
|---|---|---|
| MNP-SRIt-O-VM-IW | 1 | 3 |
| MNP-SRIt-O-VM-IW | 1 | 4 |

The SAS Application Service Specific Outbound Processing Configuration Table for Normal and Abnormal Completion contains up to 10 Response Actions. One or more of these Response Actions can be used to insert configured values at defined positions in the output digit string.

There are the following configurable outbound actions for this Service Handler:

SRI Response with MSRN from SAS Database and IMSI from a predefined configured value.
Return TCAP Error with configurable Error Code.
Concatenate with other Service Handler.
Discard Message.
Store Message in local SAS file.

TABLE 21

Definition of the SAS Application Service Specific Outbound Processing Configuration Table for the Example—Normal Completion.
SAS Application Service Specific Outbound Processing Configuration Table—Normal Completion

| SAS Application Service Id | Number Type | Portability Status | Response Action Id1 | Service Control Data Slot Id | Output Digit String Id | Nature of Address Indicator |
|---|---|---|---|---|---|---|
| MNP-SRIt-O-VM-IW | MSISDN | ONNPO | Send SRI Response Operation | 0 [INRN] | 1 | Subscriber |
| MNP-SRIt-O-VM-IW | MSISDN | ONPO | Send SRI Response Operation | 0 [INRN] | 1 | Subscriber |
| MNP-SRIt-O-VM-IW | MSISDN | FNPI | Send SRI Response Operation | 0 [INRN] | 1 | Subscriber |
| MNP-SRIt-O-VM-IW | MSISDN | FNP2AFN | Send SRI Response Operation | 0 [INRN] | 1 | Subscriber |
| MNP-SRIt-O-VM-IW | MSISDN | FNNK2BP | Send SRI Response Operation | 0 [INRN] | 1 | Subscriber |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

Table 21 shows the configuration example for the case that the SRI terminating service is used stand-alone (typical for numbers with voice mail infix).

For the configuration where the SRI terminating service works together with the SRF service (see 0, typical for numbers without voice mail infix), the column "Response Action Id1" in the rows ONNPO and FNPI would contain "Send TCAP Error" and the last three columns of those rows would contain null values.

TABLE 22

Definition of the SAS Application Service Specific Outbound Processing Configuration Table for the Example—Abnormal Completion.
SAS Application Service Specific Outbound Processing Configuration Table—Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| MNP-SRIt-O-VM-IW | NO MATCH | Send TCAP Error | None. | None. | NULL |

TABLE 22-continued

Definition of the SAS Application Service Specific Outbound Processing Configuration Table for the Example—Abnormal Completion.
SAS Application Service Specific Outbound Processing Configuration Table—Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| MNP-SRIt-O-VM-IW | Error1 | Send TCAP Error | None. | None. | NULL |

Configuration Data:

Table 11 shows Details of the Loop Detection Status Configuration Table.

Configuration Items for Outbound Digits Synthesis:

Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 12 presents the information necessary to specify an input digit string. Table 13 specifies the mapping between the Input Digit String to the Output Digit String. Table 14 specifies the mapping between the Output Digit String and the Protocol Element.

Table 12 shows Details of the Output Digit String Configuration Table.

Table 13 shows Details of the Input Digit String To Output Digit String Mapping Table.

Table 14 shows Details of the Input Digit String To Protocol Element Mapping Table A single output digit sting shall be able to be selected—based on its Id—from a set of possible output digit strings. The selection is done based on the value combination of (E.164/MSIN Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. The same principle can in the future be applied to other number parts as well.

It shall be possible to specify which action is to be done in the outbound digit processing depending on the value combination of (E.164 Number Type, Portability Status). Possible actions are the type of message to be used, etc. A table has to be present to specify this configuration data. The same principle can in the future be applied to other number parts as well.

Table 16 shows Details of the SAS Application Service Specific Outbound Processing Configuration Table—Normal Completion.

Tbale 16 contains the application specific outbound processing in case an entry was found in the Single Number or Range Number Table. However, it is possible that no entry is found in both tables. This abnormal outbound processing is contained in Table 22.

Table 17 shows Details of the SAS Application Service Specific Outbound Processing Configuration Table—Abnormal Completion.

Figure 13:
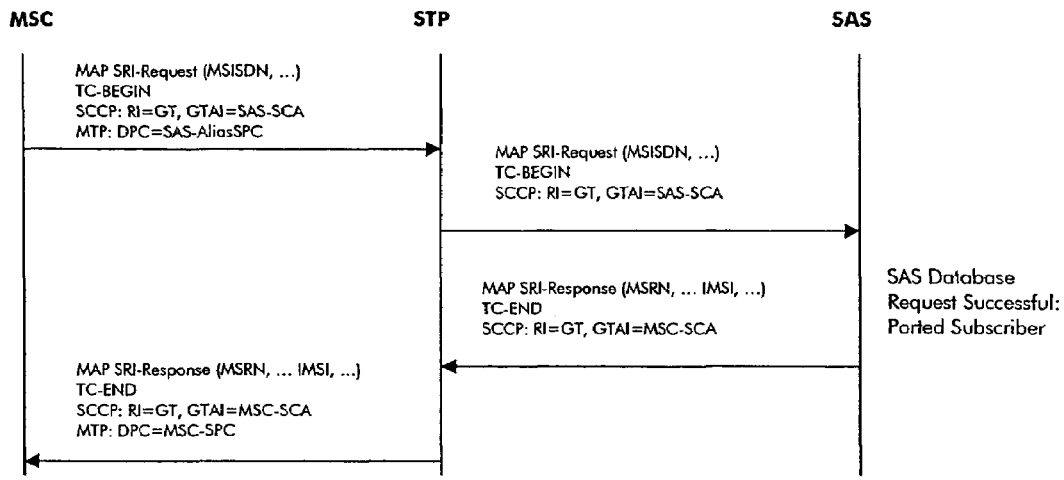
FIG. 13 shows a Query Response Scenario—Without the SRF service.

Scenarios:

FIG. 13 shows a Query Response Scenario—Without the SRF service.

Figure 14:
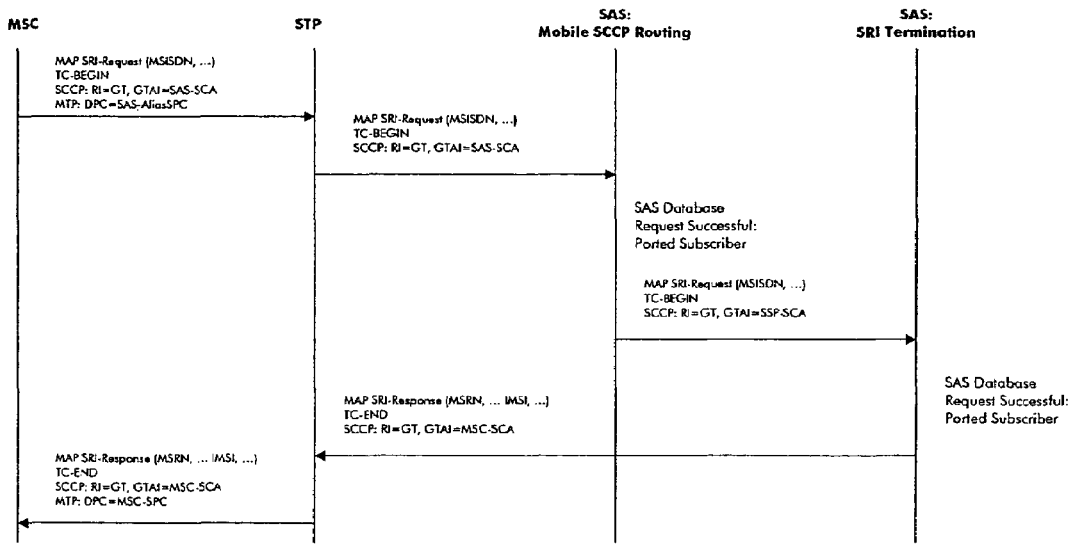
FIG. 14 shows a further Query Response Scenario—Together with the SRF service, subscriber in foreign network.

FIG. 14 shows a further Query Response Scenario—Together with the SRF service, subscriber in foreign network.

Figure 15:
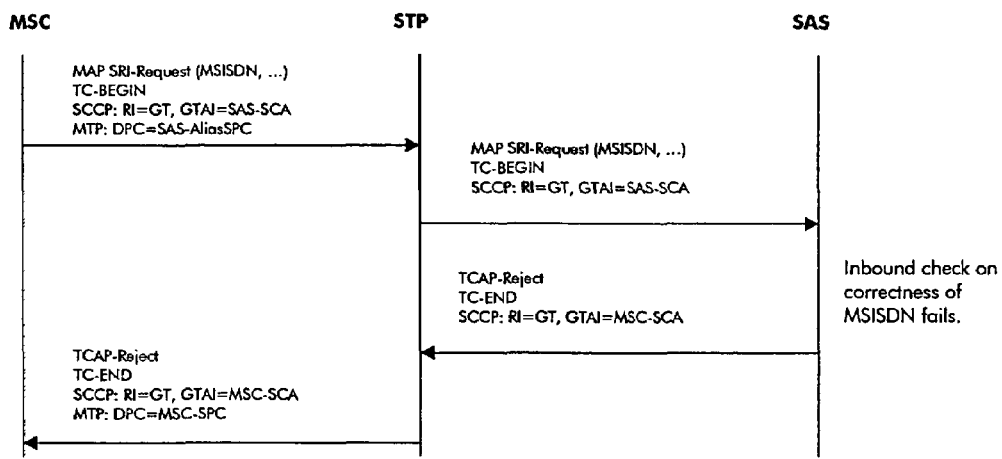
FIG. 15 shows a further Query Response Scenario (Unsuccessful)—Illegal MSISDN (containing no digits)

FIG. 15 shows a further Query Response Scenario (Unsuccessful)—Illegal MSISDN (containing no digits).

Figure 16:
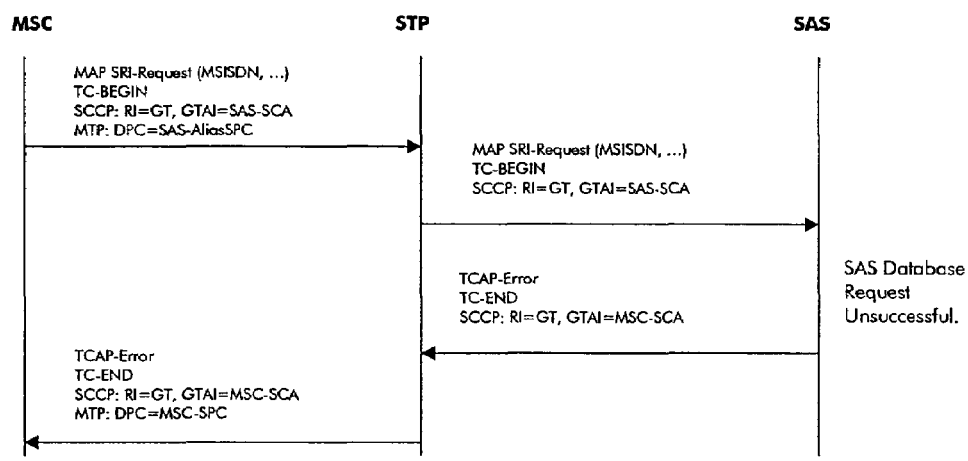
FIG. 16 shows a further Query Response Scenario (Unsuccessful)—Any error in SAS service application.

FIG. 16 shows a further Query Response Scenario (Unsuccessful)—Any error in SAS service application.

Third Embodiment of the Invention

MAP Forward Short Message Access Screening

Short Description of the Service:

In order to protect against fraud a Short Message Service Center (SMSC) normally validates if the originator of an incoming short message is belonging to the home network. Analyzing the A-number within the short message allows this validation.

However, within a Mobile Number Portability environment, the MSISDN no longer indicates the home network of the subscriber since this number could now belong to another mobile network operator. Therefore, a screening function is required based on the mobile number portability status of the originator's MSISDN. All incoming MO-FSM messages are intercepted and the MAP SM-RP-OA parameter is used as a key for searching in the number portability database.

If the calling party number within the MAP SM-RP-OA address was found in the database as an imported or regular subscriber of the concerned provider, the MO-FSM is forwarded to the SMSC. Otherwise, a backward message is created containing a MAP error code.

Detailed Description of the Service:

FIG. 1 depicts the SDL diagram of the generic structure of a SAS Application Service. Details to the individual steps can be found in the following sub-chapters.

Inbound Message Analysis:

FIG. 2 shows the SDL diagram for Inbound Message Analysis and Inbound Digit Analysis.

Application Specific Inbound Protocol Checks:

The following checks are performed for the MAP FSM service:

- Check whether the MAP SM-RP-DA parameter contains the SMSC address. If not, continue with the current SCCP routing mechanism.
- Check whether the MAP SM-RP-OA parameter contains a MSISDN. If not, continue with the current SCCP routing mechanism.
- Check whether the MSISDN is a valid number, e.g. check the numbering plan correctness. If not, continue with the current SCCP routing mechanism.

NoAI Analysis:

If all inbound protocol checks are passed successfully the NoAI of the SM-RP-OA MSISDN is extracted. In case the NoAI is not supported continue with the current SCCP routing mechanism. Otherwise select a NoAI specific analysis string. This string specifies which auxiliary number parts are existing and which of them are mandatory or optional.

Inbound Digit Analysis:

The inbound digit analysis is performed together with the analysis string.

FIG. 2 shows Inbound Address Analysis and Inbound Digit Analysis.

Figure 17:
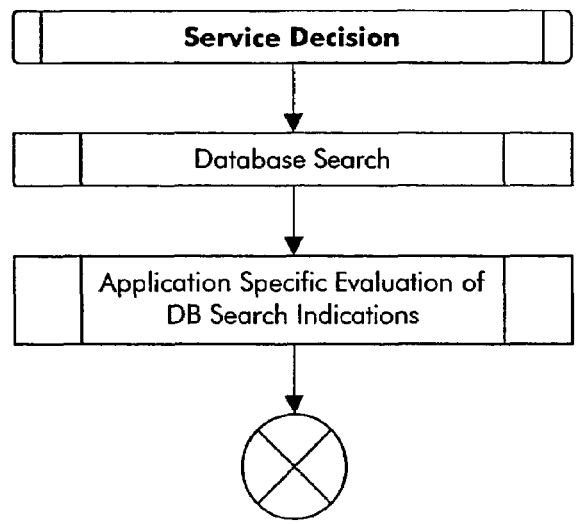
FIG. 17 shows a generic SDL diagram for the Service Decision in accordance with certain embodiments of the invention.

Service Decision:

FIG. 17 shows the generic SDL diagram for the Service Decision. The individual steps are described below.

Database Search

The extracted core part of the MSISDN is used as a key for searching in the number portability database. The search algorithm is depicted in FIG. 4. Examples for E.164 Single Number and Range Number Tables can be found in Table 1 and Table 2. Table 3 is an example for a related Service Control Data Table and Table shows a Service Control Slots Configuration Table.

Application Specific Evaluation of DB Search Indications

If the DB search result is different from MATCH in SINGLE TABLE/MATCH in RANGE TABLE the Not Found Response Action is executed. This action is configurable and is either set to Continue Routing or Return an Error.

In any other case one of the following response actions is selected:

Return an Error

Continue Routing with the current SCCP routing mechanism

Continue Routing with Routing Number Replacement

Continue Routing with Routing Number Prefix

This response action is configuration controlled and depends on the Service Control Data Record, the Number Type, the Portability Status and other configuration data items.

FIG. 4 shows Database Search in E.164 Single Number and Range Number Tables.

Table 1 shows an Example for an E.164 Single Number Table.

Table 2 shows an Example for an E.164 Range Number Table.

Notes to Table 1 and Table 2: Due to space reasons only three Service Control Data Slots are shown instead of five.

Table 3 shows an Example for a Service Control Data Table.

Table 4 shows an Example for a Service Control Slots Configuration Table.

Outbound Message Synthesis:

FIG. 5 shows generic aspects of the outbound message synthesis. For the MAP FSM service the following rules apply:

- If the response action indicates Return Error, a TCAP Error message is returned containing a MAP error code.
- If the response action indicates Continue Routing without Routing Number, the message shall be forwarded based on the current SCCP routing mechanism.
- If the response action indicates Continue Routing with Routing Number Replacement, then the SCCP called party Global Address Title is replaced by the Routing Number, which is retrieved from the Service Control Data Table.
- If the response action indicates Continue Routing with Routing Number Prefix, then the SCCP called party Global Address Title is set to the following value:

[CC]+RN+SN

FIG. 5 shows Generic Aspects of Outbound Message Synthesis.

Configuration tables control Outbound Message Synthesis. The configuration tables of the Outbound Message Synthesis are illustrated by an example (see Tables 10–12 and Tables 23–27). The SAS Application Service is the same as the one used above, MAP FSM (with a response action set to Continue Routing with Routing Number Prefix).

An Output Address includes the triple (NoAI, Numbering Plan, Digit String). The Output Digit String Configuration Table specifies the necessary output digit strings of the SAS Application Service, including a NoAI value. The value for Numbering Plan is implicitly present in the service logic of the SAS Application Service. Memory has to be allocated for the digit string elements of the Output Digit String Configuration Table, plus for Nat1 and Nat2 or Nat.

TABLE 23

Example for the definition of the Output Digit String Configuration Table.
Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| MAP-FSM | 1 | RN | National | Always | Prefix-0 |
| MAP-FSM | 1 | Nat1 | National | Copy Input | Nat1 |
| MAP-FSM | 1 | Nat2 | National | Copy Input | Nat2 |

TABLE 24

Output Digit String to Protocol Element Mapping Table for Table 23.
Output Digit String To Protocol Element Mapping Table

| SAS Application Service Id | Output Digit String Id | Protocol Element Id | Output Digit String Option |
|---|---|---|---|
| MAP-FSM | 1 | SCCP CdPA GTA | 1 |

TABLE 25

Input Digit String To Output Digit String Mapping for Table 23.
Input Digit String To Output Digit String Mapping Table

| SAS Application Service Id | Output Digit String Id | Input Digit String Id |
|---|---|---|
| MAP-FSM | 1 | 2 |

The SAS Application Service Specific Outbound Processing Configuration Table for Normal and Abnormal Completion contains up to 10 Response Actions. One or more of these Response Actions can be used to insert configured values at defined positions in the output digit string.

There are the following configurable outbound actions for this Service Handler:
Relay MO_Forward_SM message.
Return TCAP Error with configurable Error Code.
Concatenate with other Service Handler.
Discard Message.
Store Message in local SAS file.

TABLE 26

Definition of the SAS Application Service Specific Outbound Processing Configuration Table Example—Normal Completion.
SAS Application Service Specific Outbound Processing Configuration Table—Normal Completion

| SAS Application Service Id | Number Type | Portability Status | Response Action Id1 | Service Control Data Slot Id | Output Digit String Id | Nature of Address Indicator |
|---|---|---|---|---|---|---|
| MAP-FSM | MSISDN | ONNPO | Relay MAP MO-FSM message | None | None | NULL |
| MAP-FSM | MSISDN | ONPO | Send TCAP Error | None | None | NULL |
| MAP-FSM | MSISDN | FNPI | Relay MAP MO-FSM message | None | None | NULL |
| MAP-FSM | MSISDN | FNP2AFN | Send TCAP Error | None | None | NULL |
| MAP-FSM | MSISDN | FNNK2BP | Send TCAP Error | None | None | NULL |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

Note to Table 26: In this example the MO-FSM message is just forwarded based on the current SCCP routing mechanism without changing the SCCP CdPA GTA.

TABLE 27

Definition of the SAS Application Service Specific Outbound Processing Configuration Table Example—Abnormal Completion.
SAS Application Service Specific Outbound Processing Configuration Table—Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| MAP-FSM | NO MATCH | Send TCAP Error | None | None | NULL |
| MAP-FSM | Error1 | Send TCAP Error | None | None | NULL |

Configuration Data:

Configuration Items for Loop Detection:
Table 10 shows Details of the Loop Detection Status Configuration Table.
Note: For the MAP FSM service the loop detection status is always set to Disabled.

Configuration Items for Outbound Digits Synthesis:
Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 11 presents the information necessary to specify an output digit string. Table 12 specifies the mapping between the Input Digit String to the Output Digit String. Table 13 specifies the mapping between the Output Digit String and the Protocol Element.

Table 11 shows Details of the Output Digit String Configuration Table.

Table 12 shows Details of the Input Digit String to Output Digit String Mapping Table.

Table 13 shows Details of the Input Digit String to Protocol Element Mapping Table.

A single output digit sting shall be able to be selected—based on its Id—from a set of possible output digit strings. The selection is done based on the value combination of (E.164 Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. In the future the same principle can be applied to other number parts as well.

It shall be possible to specify which action is to be done in the outbound digit processing depending on the value combination of (E.164 Number Type, Portability Status). Possible actions are the type of message to be used, etc. A table has to be present to specify this configuration data in the future the same principle can be applied to other number parts as well.

Table 14 shows Details of the SAS Application Service Specific Outbound Processing Configuration Table—Normal Completion.

Table 14 contains the application specific outbound processing in case an entry was found in the Single Number or Range Number Table. However, it is possible that no entry is found in both tables. This abnormal outbound processing is specified in Table 15.

Table 15 shows Details of the SAS Application Service Specific Outbound Processing Configuration Table—Abnormal Completion.

Figure 18:
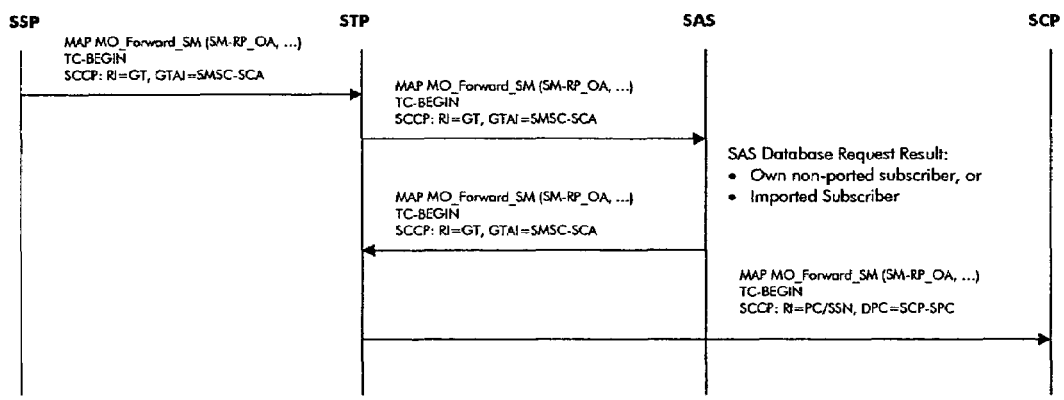
FIG. 18 shows a FSM Scenario for a Regular or Imported Subscriber.

Scenarios:

FIG. 18 shows a FSM Scenario for a Regular or Imported Subscriber.

Figure 19:
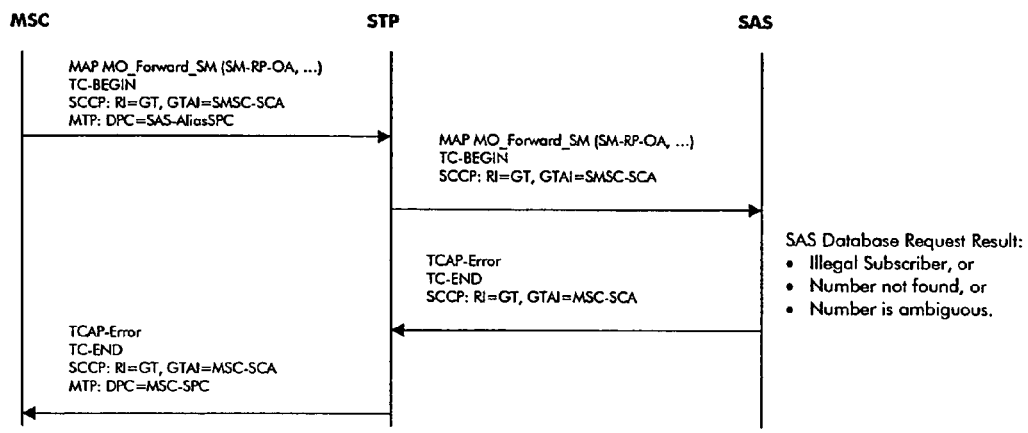
FIG. 19 shows a FSM Scenario for an Illegal Subscriber.

FIG. 19 shows a FSM Scenario for an Illegal Subscriber.

FOURTH EMBODIMENT OF THE INVENTION

Fixed SCCP Routing

Short Description:

This service realizes Number Portability on SCCP level for fixed networks (Signalling Relay Function (SRF)).

FIG. 1 depicts the SDL diagram of the Generic Structure of a SAS Application Service.

The three stages are described in detail as follows:

Stage 1—Inbound Message Analysis: This stage starts with some service specific inbound protocol checks. Depending on the NoA (Nature of Address) a specific analyse string is chosen. That analyse string describes which auxiliary number parts are mandatory or optionally. Then the auxiliary number parts are analysed. If found and correct, then remove auxiliary number part from received E.164 or MSIN Based number and store it internally. This analysis is done step by step for each possible auxiliary number part. If ambiguous then one or more digits are requested, depending on service specific configuration items. When the analysis of the auxiliary number parts terminates successfully, then the second stage starts. Each auxiliary number part is to be stored in a record containing its name, its position, its value, and its presence. Inbound Processing is configured based on the specification of the received digit string and other application service specific configuration items.

Stage 2—Service Decision: Analyse the core part of the received number in the Single Number and Range Number tables. Additional digits might be requested. The Extended Match Indicator is to be used if required. Service Decision includes also Loop Detection. The Service Decision is executed dependent on configuration data items and the Transition Indicator, the Default/Exception Indicator, and the Single Number Flag of the Single Number and Range Number tables.

Stage 3—Outbound Message Synthesis: Depending on the result of this database query and the inbound processing, the response is generated. Outbound processing is configured based on the specification of the digit string to be sent off, the Service Control Data Record, the Number Type and the Portability Status, and other configuration data items.

FIG. 2 shows Inbound Address Analysis and Inbound Digit Analysis.

FIG. 3 shows Service Decision.

For those SAS Application Services that are required to search the E.164 or MSIN Based Tables for routing information, the following principles apply. The search of the E.164 or MSIN Based Tables constitutes the main service decision. FIG. 3 depicts the SDL diagram of the Service Decision.

The Evaluation of Database Search Indications is a SAS Application Service specific matter, also the decision whether or not to perform another SAS Database search. Both, the application specific evaluations and the decision for further database searches, depend on the SAS Application Service's service logic, configurable items and other things.

Loop Detection is a mechanism to discover inconsistencies in the received data, which might be caused by a condition that causes the SS7 message to loop through the SS7 network. There are two kinds of loop detection: a generic one and an application specific one. The generic one is specified in detail here. The applications specific ones are specified at the respective SAS Application Services.

FIG. 1 shows Database Search in E.164 and MSIN Based Single Number and Range Number Tables Table 1 shows E.164 Single Number Table for the Example.

Table 2 shows E.164 Range Number Table for the Example.

Table 3 shows Service Control Data Table for the Example.

Table 4 shows Auxiliary Number Table for the Example.

Detection of Loops and other Inconsistencies:

Loop detection is provided to prevent signalling loops within the signalling network. Signalling loops may occur when the routing databases in different signalling networks contain inconsistent routing information for network subscribers. The ability to detect signalling loops is defined within the scope of each SAS Application Service and may not be present in all SAS Application Services. Also, the response taken to the detection of a signalling loop is defined within the scope of each SAS Application Service.

As stated above, there is a Generic Loop Detection mechanism, which applies to many SAS Application Service, and there are SAS Application Service specific Loop Detection mechanisms. The Generic Loop Detection mechanism is in detail specified here. The SAS Application Service specific Loop Detection mechanisms are outlined here and are specified at the respective SAS Application Service.

Generic Loop Detection Analysis:

The generic mechanism for the detection of signalling loops is a two step process and requires the co-operation of the underlying switched network in order to succeed. First, the underlying switched network will pass any received Inter-Network Routing Number to the SAS as part of the concerned address (i.e. the SCCP Called Party Address GTAI). This first step signals the SAS Loop Detection algorithm that the signalling message has originated outside of the current signalling network. Secondly, the E.164 database(s) search must resolve to a combination of the pair (E.164 Number Type, Portability Status) that is marked as a candidate for looping. With these two criteria met, the signalling loop is detected.

This implies, that there has to be configuration table which indicates for each pair (E.164 Number Type, Portability Status), whether loop detection is to be enabled or not.

As a temporary relaxation of the SAS Loop Detection, the Transition Time capability was introduced. This provides a synchronisation period for recent database updates. If the Transition Indicator is marked "Transition Time is not yet over", then the SAS Loop Detection is either bypassed or relaxed.

FIG. 5 shows Generic Loop Detection Analysis.

TABLE 28

Loop Detection Status And Action Configuration Table for the Example.

| SAS Application Service Id | SAS Database Id | SAS Database Table Id | Number Type | Portability Status | Loop Detection State And Action |
|---|---|---|---|---|---|
| FNP-SRF | FNP E.164 Database 0 | E.164 Single Number Table | MSISDN | ONNPO | Disabled |
| FNP-SRF | FNP E.164 Database 0 | E.164 Single Number Table | MSISDN | ONPO | Discard, Counter |
| FNP-SRF | FNP E.164 Database 0 | E.164 Single Number Table | MSISDN | FNPI | Discard, Counter |
| FNP-SRF | FNP E.164 Database 0 | E.164 Single Number Table | MSISDN | FNP2AFN | Discard, Counter |
| FNP-SRF | FNP E.164 Database 0 | E.164 Single Number Table | MSISDN | FNNK2BP | Disabled |
| FNP-SRF | FNP E.164 Database 0 | E.164 Range Number Table | MSISDN | ONNPO | Discard, Counter |
| FNP-SRF | FNP E.164 Database 0 | E.164 Range Number Table | MSISDN | ONPO | Disabled |
| FNP-SRF | FNP E.164 Database 0 | E.164 Range Number Table | MSISDN | FNPI | Disabled |
| FNP-SRF | FNP E.164 Database 0 | E.164 Range Number Table | MSISDN | FNP2AFN | Disabled |
| FNP-SRF | FNP E.164 Database 0 | E.164 Range Number Table | MSISDN | FNNK2BP | Discard, Counter |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

FIG. 6 shows Generic Aspects of Outbound Message Synthesis.

Configuration tables control Outbound Message Synthesis. The configuration tables of the Outbound Message Synthesis are illustrated by an example. The SAS Application Service is the same as the one used above: FNP-Signalling Relay Function (FNP-SRF).

An Output Address includes the triple (NoAI, Numbering Plan, Digit String). The Output Digit String Configuration Table specifies the necessary output digit strings of the SAS Application Service, including a NoAI value. The value for Numbering Plan is implicitly present in the service logic of the SAS Application Service. Memory has to be allocated for the digit string elements of the Output Digit String Configuration Table, plus for Nat1 and Nat2 or Nat.

TABLE 29

Definition of the Output Digit String Configuration Table for the Example.

Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| FNP-SRF | 1 | INRN | International | Modified Input | Prefix-0 |
| FNP-SRF | 1 | Natl | International | Copy Input | Natl |

TABLE 30

Output Digit String To Protocol Element Mapping Table for Table 29.

Output Digit String To Protocol Element Mapping Table

| SAS Application Service Id | Output Digit String Id | Protocol Element Id | Output Digit String Option |
|---|---|---|---|
| FNP-SRF | 1 | SCCP UDT Message | 1 |

TABLE 31

Input Digit String To Output Digit string Mapping Table for Table 29.

Input Digit String To Output Digit String Mapping Table

| SAS Application Service Id | Output Digit String Id | Input Digit String Id |
|---|---|---|
| FNP-SRF | 1 | 1 |
| FNP-SRF | 1 | 2 |
| FNP-SRF | 1 | 3 |
| FNP-SRF | 1 | 4 |

The SAS Application Service Specific Outbound Processing Configuration Table for Normal and Abnormal Completion contains up to 10 Response Actions. One or more of these Response Actions can be used to insert configured values at defined positions in the output digit string.

There are the following configurable outbound actions for this Service Handler:

Terminate SCCP Message: Calling Party Address and Called Party Address are swapped and then the SCCP message is sent back to the STP Core.

Relay SCCP Message: Calling Party Address and Called Party Address remain are not swapped and then the SCCP message is sent back to the STP Core.

Return UDTS/XUDTS/LUDTS Message: based on the received SCCP message type, the corresponding Service message type is generated, Calling Party Address and Called Party Address are swapped, and then the SCCP message is sent back to the STP Core.

Forward SCCP Message to other Service Handler.

Manipulate output digit string according to contents in SAS Application Service Specific Outbound Digit Sting Preparation Configuration Table.

Discard Message.

Store Message in local SAS file.

TABLE 32

Definition of the SAS Application Service Specific Outbound Processing Configuration Table for the Example—Normal Completion.

SAS Application Service Specific Outbound Processing Configuration Table— Normal Completion

| SAS Application Service Id | Number Type | Portability Status | Response Action Id1 | Service Control Data Slot Id | Output Digit String Id | Nature of Address Indicator |
|---|---|---|---|---|---|---|
| FNP-SRF | MSISDN | ONNPO | Send SCCP UDT | 1 [HLR-SCA]. | 1. | International |
| FNP-SRF | MSISDN | ONPO | Send SCCP UDT | 1 [HLR-SCA] | 1 | International |
| FNP-SRF | MSISDN | FNPI | Send SCCP UDT | 1 [HLR-SCA] | 1 | International |
| FNP-SRF | MSISDN | FNP2AFN | Send SCCP UDT | 1 [HLR-SCA] | 1 | International |
| FNP-SRF | MSISDN | FNNK2BP | Send SCCP UDT | 1 [HLR-SCA] | 1 | International |

The acronyms for the Portability Status are as follows:

ONNPO: Own Number Not Ported Out

ONPO: Own Number Ported Out.

FNPI: Foreign Number Ported In.

FNP2AFN: Foreign Number Ported To Another Foreign Network.

FNNK2BP: Foreign Number Not Known To Be Ported.

TABLE 33

Definition of the SAS Application Service Specific Outbound Processing Configuration Table for the Example—Abnormal Completion.
SAS Application Service Specific Outbound Processing Configuration Table—Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| FNP-SRF | NO MATCH | Return SCCP Message (Send UDTS) | SCCP return cause value. | None. | NULL |
| FNP-SRF | Number is ambiguous | Continue with SCCP routing (forward incoming SCCP UDT) | none | None. | NULL |

TABLE 34

Details of the SAS Application Service Specific Outbound Digit String Preparation Configuration Table
SAS Application Service Specific Outbound Digit String Preparation Configuration Table

| Attribute | Format | Values | Description |
|---|---|---|---|
| SAS Application Service Id | 2 Byte | Any valid SAS Application Service Id | Primary Key. |
| Output Digit String Id | 3 Byte | Any valid Input Digit String Id | Partial foreign key into the Structure of Output Digit String Configuration Table SAS Application Service specific encoding Multiple output digit strings per Protocol Element are possible. |
| Output Digit String Component Id | 1 Byte | Any valid common encoding of Service Control Data Type and Auxiliary Number Name. | This attribute identifies the Output Digit String Element onto which the digit preparation applies. It is possible to specify here the complete Output Digit String by using the mnemonic "Total Digit String" |
| Cut Position | 1 Byte | Positive Integer values 0–255. | Effect:<br>0: The Digit Preparation is specified by means of the Cut Match Length/Value.<br>1: Cut Position is before the $1^{st}$ digit.<br>2: Cut Position is before the $2^{nd}$ digit.<br>3: Cut Position is before the $3^{rd}$ digit.<br>n: Cut Position is before the $n^{th}$ digit. |
| Cut Length | 1 Byte | Positive Integer values 0–255. | Effect:<br>0: delete no digits after the Cut Position.<br>1: delete 1 digit after the Cut Position.<br>2: delete 2 digits after the Cut Position.<br>3: delete 3 digits after the Cut Position.<br>N: delete n digits after the Cut Position. |
| Cut Match Length | ½ Byte | Positive Integer values 0–15. | Length in digits of the Cut Match Value. 0 means that there is no Cut Match Value. |
| Cut Match Value | 7½ Byte | Digit String with up 15 Digits. | The Cut Match Value is a sequence of digits, which if found in search from left to right, shall be replaced by the Paste Value. |
| Paste Length | ½ Byte | Positive Integer values 0–15. | Length in digits of the Paste Value. 0 means that there is no Paste Value. |
| Paste Value | 7½ Byte | Digit String with up 15 Digits. | Value which shall be inserted at the Cut Position, or which shall replace the Cut Match Value. |

Configuration Data:

Table 11 shows Details of the Loop Detection Status Configuration Table.

Configuration Items for Outbound Digits Synthesis:

Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 12 presents the information necessary to specify an input digit string. Table 13 specifies the mapping between the Input Digit String to the Output Digit String. Table 14 specifies the mapping between the Output Digit String and the Protocol Element.

Table 12 shows Details of the Output Digit String Configuration Table.

Table 13 shows Details of the Input Digit String To Output Digit String Mapping Table.

Table 14 shows Details of the Input Digit String To Protocol Element Mapping Table.

A single output digit sting shall be able to be selected—based on its Id—from a set of possible output digit strings. The selection is done based on the value combination of (E.164/MSIN Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. The same principle can in the future be applied to other number ports as well.

It shall be possible to specify which action is to be done in the outbound digit processing depending on the value combination of (E.164 Number Type, Portability Status). Possible actions are the type of message to be used, etc. A table has to be present to specify this configuration data. The same principle can in the future be applied to other number parts as well.

Table 15 shows Details of the SAS Application Service Specific Outbound Processing Configuration Table—Normal Completion.

Table 15 contains the application specific outbound processing in case an entry was found in the Single Number or Range Number Table. However, it is possible that no entry is found in both tables. This abnormal outbound processing is contained in Table 33.

Table 16 shows Details of the SAS Application Service Specific Outbound Processing Configuration Table—Abnormal Completion.

Figure 20:
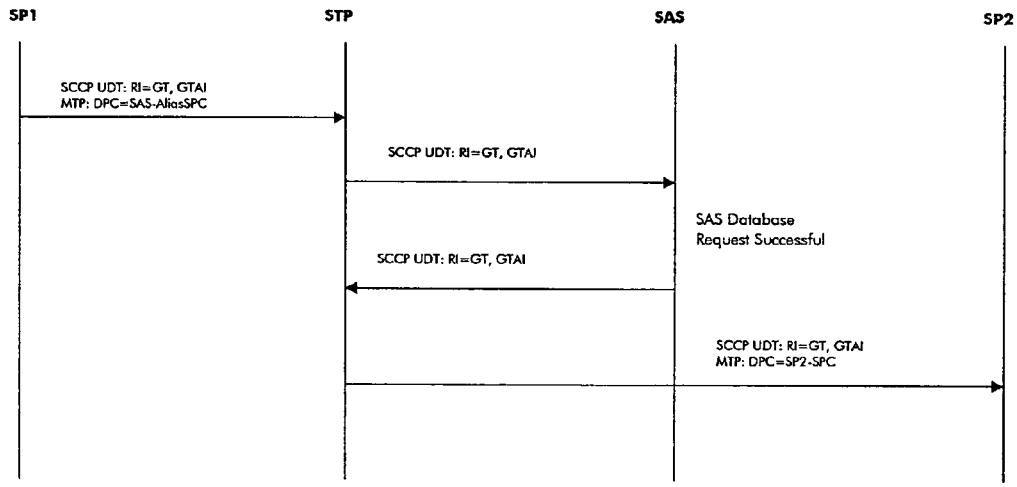
FIG. 20 shows a Query Response Scenario—Direct Response.

Scenarios:

FIG. 20 shows a Query Response Scenario—Direct Response.

Figure 21:
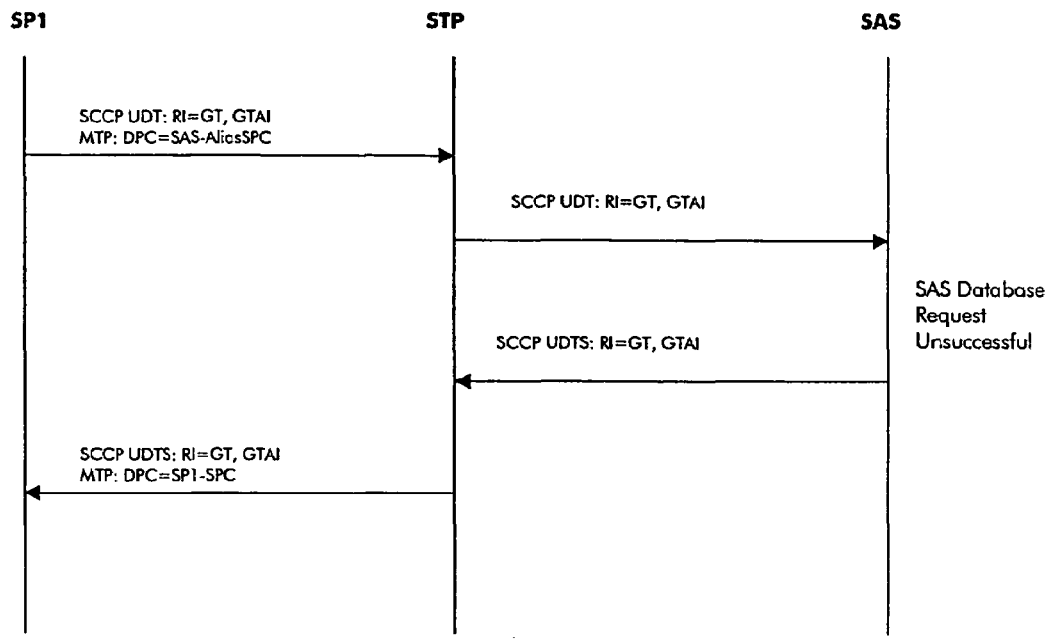
FIG. 21 shows a Query Response Scenario (Unsuccessful)—With SCCP UDTS.

FIG. 21 shows a Query Response Scenario (Unsuccessful)—With SCCP UDTS.

Figure 22:
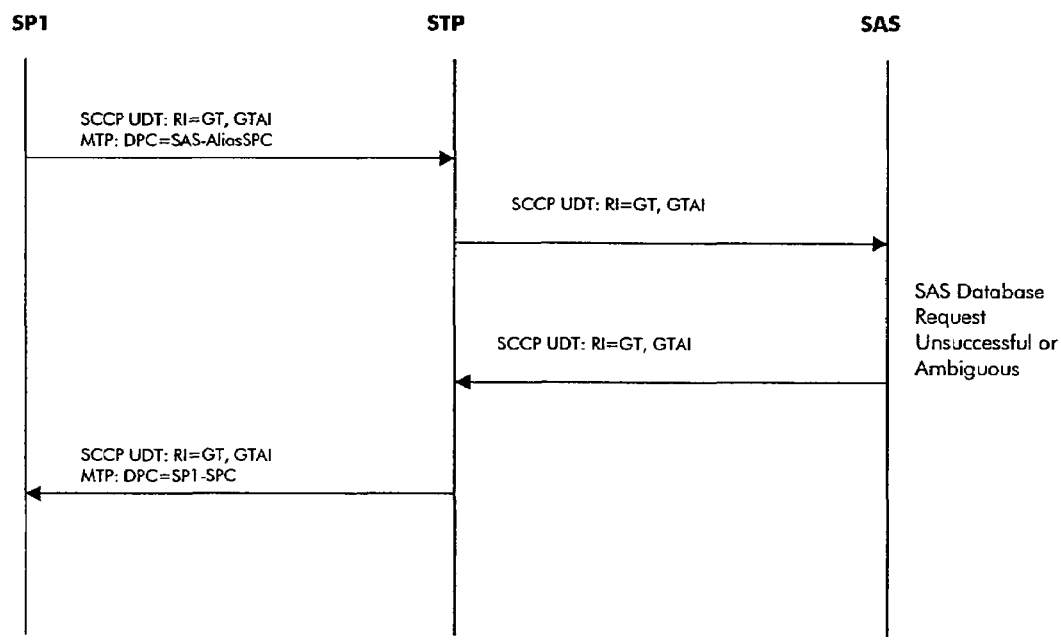
FIG. 22 shows a Query Response Scenario (Unsuccessful)—Continue With SCCP Routing.

FIG. 22 shows a Query Response Scenario (Unsuccessful)—Continue With SCCP Routing.

Fifth Embodimert of the Invention

CAP IDP Relay Mobile Number Portability

Short Description

This service includes CAP IDP Relay MNP (Mobile Number Portability) with optionally voice mail. All these combinations are configurable.

In short, the service use the address information contained in the CAP IDP data to interrogate the subscriber database. The contents of the database (i.e. Routing Numbers) are inserted into the data layer address information and the IDP message is onward routed.

FIG. 1 depicts the SDL diagram of the Generic Structure of the CAP IDP Relay Application Service.

The three stages of the Application Service

Inbound Message Analysis:

FIG. 2 shows Inbound Address Analysis and Inbound Digit Analysis.

This stage starts with service specific inbound protocol checks. The evaluation of the 'Service Key' parameter and optionally the 'Event Type BCSM' parameter allows for only specific CAP IDP operations to be processed. If data is provisioned by the user into the CAP IDP parameter "Service Key/Event Type BCSM List" then the values of these CAP IDP parameters are compared against the data that is provisioned within the list. There will be another check for the Calling Party Number parameter. The CAP IDP involves either the 'Called Party BCD Number' parameter or the 'Called Party Number' parameter.

Depending on the NoAI (Nature of Address) a specific analyse string is chosen. That analyse string describes which auxiliary number parts are mandatory or optionally. Then the auxiliary number parts are analysed. If found and correct, then remove auxiliary number part from received E.164 or MSIN Based number and store it internally. This analysis is done step by step for each possible auxiliary number part. When the analysis of the auxiliary number parts terminates successfully, then the second stage starts. Each auxiliary number part is to be stored in a record containing its name, its position, its value, and its presence. Inbound Processing is configured based on the specification of the received digit string and other application service specific configuration items. If an unsupported Nature of Address is received, then the signalling message shall continue with the current SCCP routing mechanism.

Service Decision:

FIG. 17 shows Service Decision.

This stage analyses the core part of the received number in the Single Number and Range Number tables. The Extended Match Indicator is to be used if required. The Service Decision is executed dependent on configuration data items and the Transition Indicator, the Default/Exception Indicator, and the Single Number Flag of the Single Number and Range Number tables.

For those SAS Application Services that are required to search the E.164 or MSIN Based Tables for routing information, the following principles apply. The search of the E.164 or MSIN Based Tables constitutes the main service decision. FIG. 17 depicts the SDL diagram of the Service Decision.

Database Search:

The Evaluation of Database Search Indication is a SAS Application Service specific matter, also the decision whether or not to perform another SAS Database search. The Application Specific Evaluation of Database Search Indications includes some specific actions. Both, the application specific evaluations and the decision for further database searches, depend on the SAS Application Service's service logic, configurable items such as "Open/Closed Numbering Plan", "Block/Single Number Dialling", "Request More Digits Yes/No", and other things.

FIG. 4 shows Database Search in E.164 and MSIN Based Single Number and Range Number Tables.

Table 1 shows E.164 Single Number Table for the Example.

Table 2 shows E.164 Range Number Table for the Example.

Table 3 shows Service Control Data Table for the Example.

Table 4 shows Service Control Slots Configuration Table for the Example.

Outbound Message Synthesis:

Depending on the result of this database query and the inbound processing, the response is generated. Outbound processing is configured based on the specification of the digit string to be sent off, the Service Control Data Record, the Number Type and the Portability Status, and other configuration data items.

FIG. 5 shows Generic Aspects of Outbound Message Synthesis.

Configuration tables control the Outbound Message Synthesis. The configuration tables of the Outbound Message Synthesis are illustrated by an example. The SAS Application Service is the same as the one used above in the Cap IDP Relay with Optional Voice Mail Inter-working.

An Output Address includes the triple (NoAI, Numbering Plan, Digit String). The Output Digit String Configuration Table specifies the necessary output digit strings of the SAS Application Service, including a NoAI value. The value for Numbering Plan is implicitly present in the service logic of the SAS Application Service. Memory has to be allocated for the digit string elements of the Output Digit String Configuration Table, plus for Nat1 and Nat2 or Nat.

TABLE 35

Definition of the Output Digit String Configuration Table for the Example.
Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| MNP-CAP-RELAY-IW | 1 | INRN | Subscriber | Modified Input | Prefix-0 |
| MNP-CAP-RELAY-IW | 1 | EC1 | Subscriber | Modified Input | Prefix-1 |
| MNP-CAP-RELAY-IW | 1 | Nat1 | Subscriber | Copy Input | Nat1 |
| MNP-CAP-RELAY-IW | 1 | VMSC-INI | Subscriber | Copy Input | Infix-0 |
| MNP-CAP-RELAY-IW | 1 | Nat2 | Subscriber | Copy Input | Nat2 |

TABLE 36

Output Digit String to Protocol Element Mapping Table for Table 35.
Output Digit String To Protocol Element Mapping Table

| SAS Application Service Id | Output Digit String Id | Protocol Element Id | Output Digit String Option |
|---|---|---|---|
| MNP-CAP-RELAY-IW | 1 | CAP IDP Relay | 1 |

TABLE 37

Input Digit String to Output Digit String Mapping Table for Table 35.
Input Digit String To Output Digit String Mapping Table

| SAS Application Service Id | Output Digit String Id | Input Digit String Id |
|---|---|---|
| MNP-CAP-RELAY-IW | 1 | 1 |
| MNP-CAP-RELAY-IW | 1 | 2 |
| MNP-CAP-RELAY-IW | 1 | 3 |
| MNP-CAP-RELAY-IW | 1 | 4 |

The SAS Application Service Specific Outbound Processing Configuration Table for Normal and Abnormal Completion contains up to 10 Response Actions. One or more of these Response Actions can be used to insert configured values at defined positions in the output digit string.

There is only one configurable outbound action for this Service Handler:

Send CAP IDP Relay. The effect is as follows:
  The received CAP IDP operation is relayed exactly as received, except for the parameter CalledPartyNumber. Depending on the outcome of the database query in the Service Decision Phase, and the field Service Control Data Slot Id of the SAS Application Service Specific Outbound Processing Configuration Tables, the parameter CalledPartyNumber is modified by inserting the Inter-Network Routing Number. If no value for the Service Control Data Slot Id is provisioned, the parameter CalledPartyNumber is not changed.

Concatenate with other Service Handler.
Discard Message.
Store Message in local SAS file.

TABLE 38

Definition of the SAS Application Service Specific Outbound Processing Configuration Table for the Example—Normal Completion.
SAS Application Service Specific Outbound Processing Configuration Table—Normal Completion

| SAS Application Service Id | Number Type | Portability Status | Response Action Id1 | Service Control Data Slot Id | Output Digit String Id | Nature of Address Indicator |
|---|---|---|---|---|---|---|
| MNP-CAP-RELAY-IW | MSISDN | ONNPO | Send CAP IDP (Relay) Operation | None. | None. | NULL |
| MNP-CAP-RELAY-IW | MSISDN | ONPO | Send CAP IDP (Relay) Operation | 0 [INRN] | 1 | Subscriber |
| MNP-CAP-RELAY-IW | MSISDN | FNPI | Send CAP IDP (Relay) Operation | 0 [INRN] | 1 | Subscriber |
| MNP-CAP-RELAY-IW | MSISDN | FNP2AFN | Send CAP IDP (Relay) Operation | 0 [INRN] | 1 | Subscriber |

TABLE 38-continued

Definition of the SAS Application Service Specific Outbound Processing
Configuration Table for the Example—Normal Completion.
SAS Application Service Specific Outbound Processing Configuration Table—
Normal Completion

| SAS Application Service Id | Number Type | Portability Status | Response Action Id1 | Service Control Data Slot Id | Output Digit String Id | Nature of Address Indicator |
|---|---|---|---|---|---|---|
| MNP-CAP-RELAY-IW | MSISDN | FNNK2BP | Send CAP IDP (Relay) Operation | None. | None. | NULL |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

TABLE 39

Definition of the SAS Application Service Specific Outbound Processing
Configuration Table for the Example—Abnormal Completion.
SAS Application Service Specific Outbound Processing Configuration Table—
Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| MNP-CAP-RELAY-IW | NO MATCH | Send CAP IDP (Relay) Operation | None. | None. | NULL |
| MNP-CAP-RELAY-IW | AMBIGOUS | Send CAP IDP (Relay) Operation | None | None | NULL |
| MNP-CAP-RELAY-IW | Error1 | Send CAP IDP (Relay) Operation | None. | None. | NULL |

Configuration Data:

Configuration Items for Outbound Digits Synthesis:

Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 12 presents the information necessary to specify an input digit string. Table 13 specifies the mapping between the Input Digit String to the Output Digit String. Table 14 specifies the mapping between the Output Digit String and the Protocol Element.

Table 12 shows Details of the Output Digit String Configuration Table.

Table 13 shows Details of the Input Digit String to Output Digit String Mapping Table.

Table 14 shows Details of the Input Digit String to Protocol Element Mapping Table.

A single output digit sting shall be able to be selected—based on its Id—from a set of possible output digit strings. The selection is done based on the value combination of (E.164/MSIN Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. The same principle can in the future be applied to other number parts as well.

It shall be possible to specify which action is to be done in the outbound digit processing depending on the value combination of (E.164 Number Type, Portability Status). Possible actions are the type of message to be used, etc. A table has to be present to specify this configuration data. The same principle can in the future be applied to other number parts as well.

Table 15 shows Details of the SAS Application Service Specific Outbound Processing Configuration Table—Normal Completion.

Table 15 contains the application specific outbound processing in case an entry was found in the Single Number or Range Number Table. However, it is possible that no entry is found in both tables. This abnormal outbound processing is contained in Table 39.

Table 16 shows Details of the SAS Application Service Specific Outbound Processing Configuration Table—Abnormal Completion.

Figure 23:
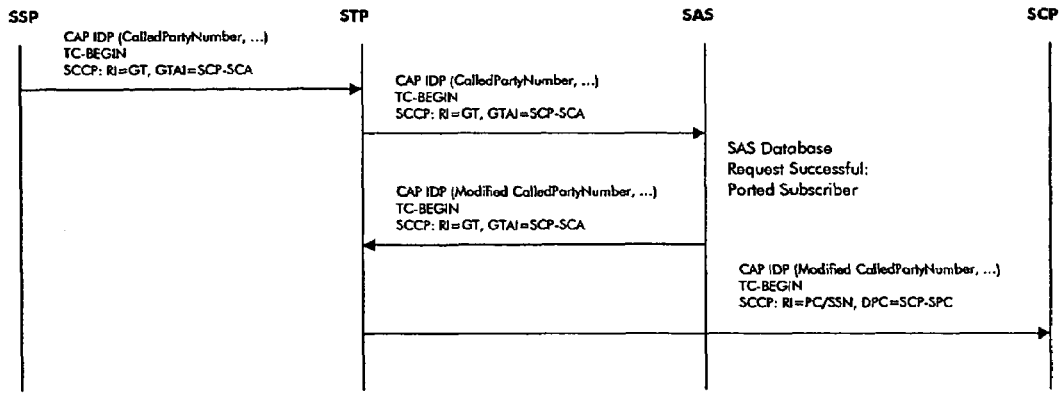
FIG. 23 shows a Relay Scenario (Successful)

Scenarios:

FIG. 23 shows a Relay Scenario (Successful).

Figure 24:
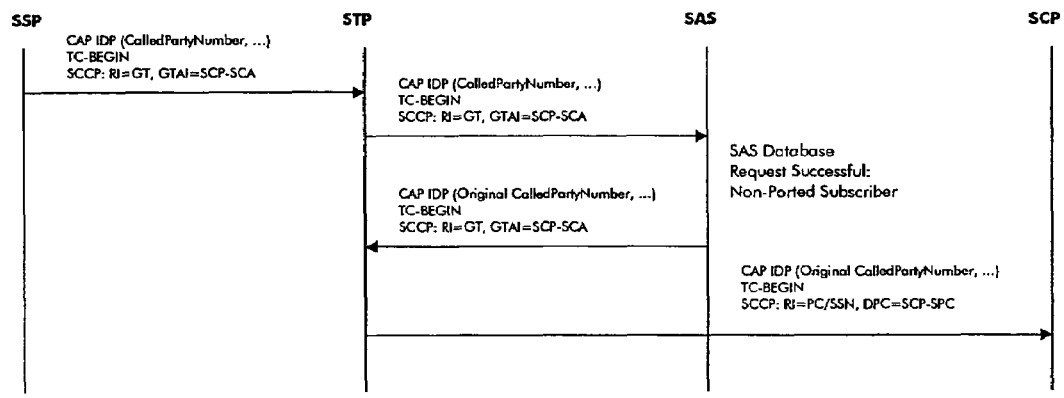
FIG. 24 shows an alternative Relay Scenario (Successful)

FIG. 24 shows an alternative Relay Scenario (Successful).

Figure 25:
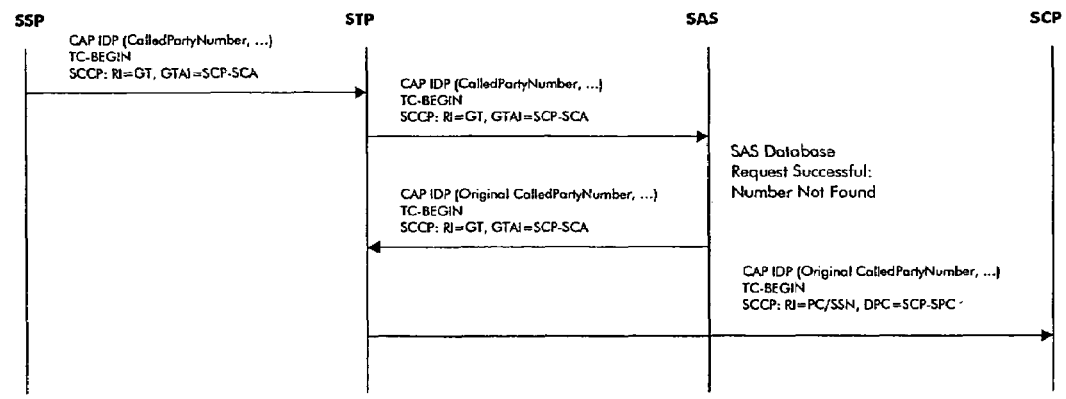
FIG. 25 shows a Relay Scenario (Unsuccessful)

FIG. 25 shows a Relay Scenario (Unsuccessful).

Sixth Embodiment of the Invention

INAP IDP Relay (Prepaid I/W)

Short Description:

This service includes INAP IDP Relay (Prepaid/I/W) with optionally voice mail; IDP=Initial DP. All these combinations are configurable.

In short, the service use the address information contained in the INAP IDP data to interrogate the subscriber database. The contents of the database (i.e. Routing Numbers) are inserted into the data layer address information and the IDP message is onward routed.

FIG. 1 depicts the SDL diagram of the Generic Structure of the INAP IDP Relay Application Service.

The three stages of the Application Service:

Inbound Message Analysis:

FIG. 2 shows Inbound Address Analysis and Inbound Digit Analysis.

This stage starts with service specific inbound protocol checks. The evaluation of the 'Service Key' parameter and optionally the 'Event Type BCSM' parameter allows for only specific INAP IDP operations to be processed. If data is provisioned by the user into the INAP IDP parameter "Service Key/Event Type BCSM List" then the values of these INAP IDP parameters are compared against the data that is provisioned within the list. There will be another check for the Calling Party Number parameter. The INAP IDP involves either the 'Called Party BCD Number' parameter or the 'Called Party Number' parameter.

Depending on the NoAI (Nature of Address) a specific analyse string is chosen. That analyse string describes which auxiliary number parts are mandatory or optionally. Then the auxiliary number parts are analysed. If found and correct, then remove auxiliary number part from received E.164 or MSIN Based number and store it internally. This analysis is done step by step for each possible auxiliary number part. When the analysis of the auxiliary number parts terminates successfully, then the second stage starts. Each auxiliary number part is to be stored in a record containing its name, its position, its value, and its presence. Inbound Processing is configured based on the specification of the received digit string and other application service specific configuration items. If an unsupported Nature of Address is received, then the signalling message shall continue with the current SCCP routing mechanism.

Service Decision:

FIG. 17 shows Service Decision.

This stage analyses the core part of the received number in the Single Number and Range Number tables. The Extended Match Indicator is to be used if required. The Service Decision is executed dependent on configuration data items and the Transition Indicator, the Default/Exception Indicator, and the Single Number Flag of the Single Number and Range Number tables.

For those SAS Application Services that are required to search the E.164 or MSIN Based Tables for routing information, the following principles apply. The search of the E.164 or MSIN Based Tables constitutes the main service decision. FIG. 17 depicts the SDL diagram of the Service Decision.

Database Search:

The Evaluation of Database Search Indication is a SAS Application Service specific matter, also the decision whether or not to perform another SAS Database search. The Application Specific Evaluation of Database Search Indications includes some specific actions. Both, the application specific evaluations and the decision for further database searches, depend on the SAS Application Service's service logic, configurable items such as "Open/Closed Numbering Plan", "Block/Single Number Dialling", "Request More Digits Yes/No", and other things.

FIG. 4 shows Database Search in E.164 and MSIN Based Single Number and Range Number Tables.

Table 1 shows E.164 Single Number Table for the Example.

Table 2 shows E.164 Range Number Table for the Example.

Table 3 shows Service Control Data Table for the Example.

Table 4 shows Service Control Slots Configuration Table for the Example.

Outbound Message Synthesis:

Depending on the result of this database query and the inbound processing, the response is generated. Outbound processing is configured based on the specification of the digit string to be sent off, the Service Control Data Record, the Number Type and the Portability Status, and other configuration data items.

FIG. 5 shows Generic Aspects of Outbound Message Synthesis.

Configuration tables control the Outbound Message Synthesis. The configuration tables of the Outbound Message Synthesis are illustrated by an example. The SAS Application Service is the same as the one used above in the INAP IDP Relay with Optional Voice Mail Inter-working.

An Output Address includes the triple (NoAI, Numbering Plan, Digit String). The Output Digit String Configuration Table specifies the necessary output digit strings of the SAS Application Service, including a NoAI value. The value for Numbering Plan is implicitly present in the service logic of the SAS Application Service. Memory has to be allocated for the digit string elements of the Output Digit String Configuration Table, plus for Nat1 and Nat2 or Nat.

TABLE 40

Definition of the Output Digit String Configuration Table for the Example.

Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| INAP-IDP-RELAY-I/W | 1 | INRN | Subscriber | Modified Input | Prefix-0 |
| INAP-IDP-RELAY-I/W | 1 | EC1 | Subscriber | Modified Input | Prefix-1 |

TABLE 40-continued

Definition of the Output Digit String Configuration Table for the Example.
Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| INAP-IDP-RELAY-I/W | 1 | Nat1 | Subscriber | Copy Input | Nat1 |
| INAP-IDP-RELAY-I/W | 1 | VMSC-INI | Subscriber | Copy Input | Infix-0 |
| INAP-IDP-RELAY-I/W | 1 | Nat2 | Subscriber | Copy Input | Nat2 |

TABLE 41

Output Digit String to Protocol Element Mapping Table for Table 40.
Output Digit String To Protocol Element Mapping Table

| SAS Application Service Id | Output Digit String Id | Protocol Element Id | Output Digit String Option |
|---|---|---|---|
| INAP-IDP-RELAY-I/W | 1 | INAP IDP Relay | 1 |

TABLE 42

Input Digit String to Output Digit String Mapping Table for Table 40.
Input Digit String To Output Digit String Mapping Table

| SAS Application Service Id | Output Digit String Id | Input Digit String Id |
|---|---|---|
| INAP-IDP-RELAY-I/W | 1 | 1 |
| INAP-IDP-RELAY-I/W | 1 | 2 |
| INAP-IDP-RELAY-I/W | 1 | 3 |
| INAP-IDP-RELAY-I/W | 1 | 4 |

The SAS Application Service Specific Outbound Processing Configuration Table for Normal and Abnormal Completion contains up to 10 Response Actions. One or more of these Response Actions can be used to insert configured values at defined positions in the output digit string.

There are only two configurable outbound actions for this Service Handler:

Send INAP IDP Relay. The effect is as follows:
The received INAP IDP operation is relayed exactly as received, except for the parameter CalledPartyNumber. Depending on the outcome of the database query in the Service Decision Phase, and the field Service Control Data Slot Id of the SAS Application Service Specific Outbound Processing Configuration Tables, the parameter CalledPartyNumber is modified by inserting the Inter-Network Routing Number. If no value for the Service Control Data Slot Id is provisioned, the parameter CalledPartyNumber is not changed.

Concatenate with other Service Handler.
Discard Message.
Store Message in local SAS file.

TABLE 43

Definition of the SAS Application Service Specific Outbound Processing Configuration Table for the Example—Normal Completion.
SAS Application Service Specific Outbound Processing Configuration Table—Normal Completion

| SAS Application Service Id | Number Type | Portability Status | Response Action Id1 | Service Control Data Slot Id | Output Digit String Id | Nature of Address Indicator |
|---|---|---|---|---|---|---|
| INAP-IDP-RELAY-I/W | MSISDN | ONNPO | Send INAP IDP (Relay) Operation | None. | None. | NULL |
| INAP-IDP-RELAY-I/W | MSISDN | ONPO | Send INAP IDP (Relay) Operation | 0 [INRN] | 1 | Subscriber |
| INAP-IDP-RELAY-I/W | MSISDN | FNPI | Send INAP IDP (Relay) Operation | 0 [INRN] | 1 | Subscriber |
| INAP-IDP-RELAY-I/W | MSISDN | FNP2AFN | Send INAP IDP (Relay) Operation | 0 [INRN] | 1 | Subscriber |
| INAP-IDP-RELAY-I/W | MSISDN | FNNK2BP | Send INAP IDP (Relay) Operation | None. | None. | NULL |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

TABLE 44

Definition of the SAS Application Service Specific Outbound Processing
Configuration Table for the Example—Abnormal Completion.
SAS Application Service Specific Outbound Processing Configuration Table—
Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| INAP-IDP-RELAY-I/W | NO MATCH | Send INAP IDP (Relay) Operation | None. | None. | NULL |
| INAP-IDP-RELAY-I/W | AMBIGOUS | Send INAP IDP (Relay) Operation | None | None | NULL |
| INAP-IDP-RELAY-I/W | Error1 | Send INAP IDP (Relay) Operation | None. | None. | NULL |

Configuration Data:

Configuration Items for Outbound Digits Synthesis:

Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 12 presents the information necessary to specify an input digit string. Table 13 specifies the mapping between the Input Digit String to the Output Digit String. Table 14 specifies the mapping between the Output Digit String and the Protocol Element.

Table 12 shows Details of the Output Digit String Configuration Table.

Table 13 shows Details of the Input Digit String to Output Digit String Mapping Table.

Table 14 shows Details of the Input Digit String to Protocol Element Mapping Table.

A single output digit sting shall be able to be selected—based on its Id—from a set of possible output digit strings. The selection is done based on the value combination of (E.164/MSIN Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. The same principle can in the future be applied to other number parts as well.

It shall be possible to specify which action is to be done in the outbound digit processing depending on the value combination of (E.164 Number Type, Portability Status). Possible actions are the type of message to be used, etc. A table has to be present to specify this configuration data. The same principle can in the future be applied to other number parts as well.

Table 15 shows Details of the SAS Application Service Specific Outbound Processing Configuration Table—Normal Completion.

Table 15 contains the application specific outbound processing in case an entry was found in the Single Number or Range Number Table. However, it is possible that no entry is found in both tables. This abnormal outbound processing is contained in Table 44.

Table 16 shows Details of the SAS Application Service Specific Outbound Processing Configuration Table—Abnormal Completion.

Figure 26:
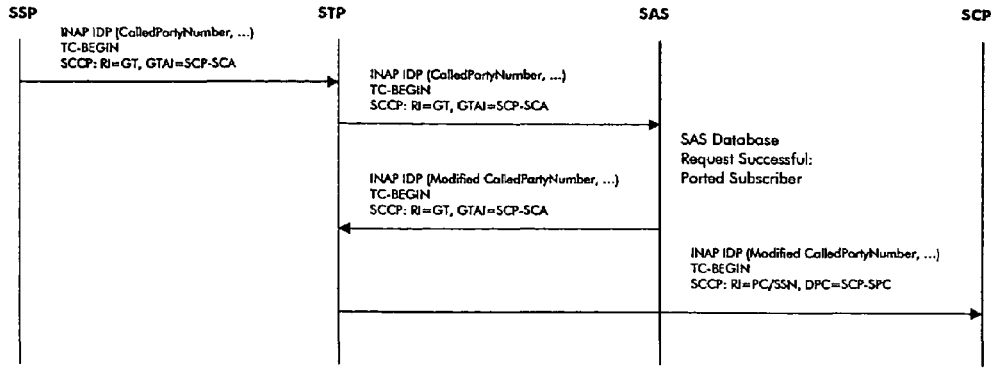
FIG. 26 shows a Relay Scenario (Successful)

Scenarios:

FIG. 26 shows a Relay Scenario (Successful).

Figure 27:
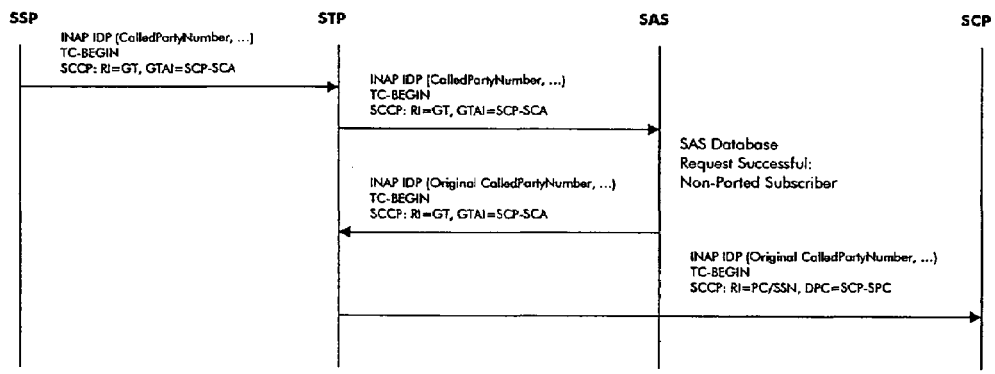
FIG. 27 shows an alternative Relay Scenario (Successful)

FIG. 27 shows an alternative Relay Scenario (Successful).

Figure 28:
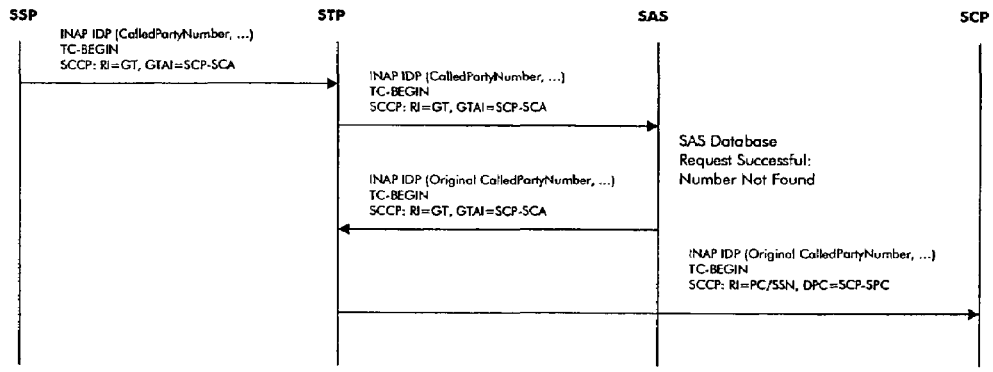
FIG. 28 shows a Relay Scenario (Unsuccessful)

FIG. 28 shows a Relay Scenario (Unsuccessful).

Seventh Embodiment of the Invention

Mobile SCCP Routing

Short Description:

This service realizes Number Portability on SCCP level for mobile networks (e.g. Signalling Relay Function (SRF), Non Call Related Service (NCR), Flexible Routing (FLR)).

FIG. 1 depicts the SDL diagram of the Generic Structure of a SAS Application Service.

The three stages are described in detail as follows:

Stage 1—Inbound Message Analysis: This stage starts with some service specific inbound protocol checks. Depending on the NoA (Nature of Address) a specific analyse string is chosen. That analyse string describes which auxiliary number parts are mandatory or optionally. Then the auxiliary number parts are analysed. If found and correct, then remove auxiliary number part from received E.164 or MSIN Based number and store it internally. This analysis is done step by step for each possible auxiliary number part. If ambiguous then one or more digits are requested, depending on service specific configuration items. When the analysis of the auxiliary number parts terminates successfully, then the second stage starts. Each auxiliary number part is to be stored in a record containing its name, its position, its value, and its presence. Inbound Processing is configured based on the specification of the received digit string and other application service specific configuration items.

Stage 2—Service Decision: Analyse the core part of the received number in the Single Number and Range Number tables. Additional digits might be requested. The Extended Match Indicator is to be used if required. Service Decision includes also Loop Detection. The Service Decision is executed dependent on configuration data items and the Transition Indicator, the Default/Exception Indicator, and the Single Number Flag of the Single Number and Range Number tables.

Stage 3—Outbound Message Synthesis: Depending on the result of this database query and the inbound processing, the response is generated. Outbound processing is configured based on the specification of the digit string to be sent off, the Service Control Data Record, the Number Type and the Portability Status, and other configuration data items.

FIG. 2 shows Inbound Address Analysis and Inbound Digit Analysis.

FIG. 3 shows Service Decision.

For those SAS Application Services that are required to search the E.164 or MSIN Based Tables for routing information, the following principles apply. The search of the E.164 or MSIN Based Tables constitutes the main service decision. FIG. 3 depicts the SDL diagram of the Service Decision.

The Evaluation of Database Search Indications is a SAS Application Service specific matter, also the decision whether or not to perform another SAS Database search. Both, the application specific evaluations and the decision for further database searches, depend on the SAS Application Service's service logic, configurable items and other things.

Loop Detection is a mechanism to discover inconsistencies in the received data, which might be caused by a condition that causes the SS7 message to loop through the SS7 network. There are two kinds of loop detection: a generic one and an application specific one. The generic one is specified in detail here. The applications specific ones are specified at the respective SAS Application Services.

FIG. 4 shows Database Search in E.164 and MSIN Based Single Number and Range Number Tables.

Table 1 shows E.164 Single Number Table for the Example.

Table 2 shows E.164 Range Number Table for the Example.

Table 3 shows Service Control Data Table for the Example.

Table 4 shows Auxiliary Number Table for the Example.

Detection of Loops and other Inconsistencies:

Loop detection is provided to prevent signalling loops within the signalling network. Signalling loops may occur when the routing databases in different signalling networks contain inconsistent routing information for network subscribers. The ability to detect signalling loops is defined within the scope of each SAS Application Service and may not be present in all SAS Application Services. Also, the response taken to the detection of a signalling loop is defined within the scope of each SAS Application Service.

As stated above, there is a Generic Loop Detection mechanism, which applies to many SAS Application Service, and there are SAS Application Service specific Loop Detection mechanisms. The Generic Loop Detection mechanism is in detail specified here. The SAS Application Service specific Loop Detection mechanisms are outlined here and are specified at the respective SAS Application Service.

Generic Loop Detection Analysis:

The generic mechanism for the detection of signalling loops is a two step process and requires the co-operation of the underlying switched network in order to succeed. First, the underlying switched network will pass any received Inter-Network Routing Number to the SAS as part of the concerned address (i.e. the SCCP Called Party Address GTAI). This first step signals the SAS Loop Detection algorithm that the signalling message has originated outside of the current signalling network. Secondly, the E.164 database(s) search must resolve to a combination of the pair (E.164 Number Type, Portability Status) that is marked as a candidate for looping. With these two criteria met, the signalling loop is detected.

This implies, that there has to be configuration table which indicates for each pair (E.164 Number Type, Portability Status), whether loop detection is to be enabled or not.

As a temporary relaxation of the SAS Loop Detection, the Transition Time capability was introduced. This provides a synchronisation period for recent database updates. If the Transition Indicator is marked "Transition Time is not yet over", then the SAS Loop Detection is either bypassed or relaxed.

FIG. 5 shows Generic Loop Detection Analysis.

TABLE 45

Loop Detection Status And Action Configuration Table for the Example.

| SAS Application Service Id | SAS Database Id | SAS Database Table Id | Number Type | Portability Status | Loop Detection State And Action |
| --- | --- | --- | --- | --- | --- |
| MNP-NCR | MNP E. 164 Database 0 | E. 164 Single Number Table | MSISDN | ONNPO | Disabled |
| MNP-NCR | MNP E. 164 Database 0 | E. 164 Single Number Table | MSISDN | ONPO | Discard, Counter |
| MNP-NCR | MNP E. 164 Database 0 | E. 164 Single Number Table | MSISDN | FNPI | Discard, Counter |
| MNP-NCR | MNP E. 164 Database 0 | E. 164 Single Number Table | MSISDN | FNP2AFN | Discard, Counter |
| MNP-NCR | MNP E. 164 Database 0 | E. 164 Single Number Table | MSISDN | FNNK2BP | Disabled |
| MNP-NCR | MNP E. 164 Database 0 | E. 164 Range Number Table | MSISDN | ONNPO | Discard, Counter |
| MNP-NCR | MNP E. 164 Database 0 | E. 164 Range Number Table | MSISDN | ONPO | Disabled |
| MNP-NCR | MNP E. 164 Database 0 | E. 164 Range Number Table | MSISDN | FNPI | Disabled |

TABLE 45-continued

Loop Detection Status And Action Configuration Table for the Example.

| SAS Application Service Id | SAS Database Id | SAS Database Table Id | Number Type | Portability Status | Loop Detection State And Action |
|---|---|---|---|---|---|
| MNP-NCR | MNP E. 164 Database 0 | E. 164 Range Number Table | MSISDN | FNP2AFN | Disabled |
| MNP-NCR | MNP E. 164 Database 0 | E. 164 Range Number Table | MSISDN | FNNK2BP | Discard, Counter |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

FIG. 6 shows Generic Aspects of Outbound Message Synthesis.

Configuration tables control Outbound Message Synthesis. The configuration tables of the Outbound Message Synthesis are illustrated by an example. The SAS Application Service is the same as the one used above: MNP-Non Call Related Service (MNP-NCR).

An Output Address includes the triple (NoAI, Numbering Plan, Digit String). The Output Digit String Configuration Table specifies the necessary output digit strings of the SAS Application Service, including a NoAI value. The value for Numbering Plan is implicitly present in the service logic of the SAS Application Service. Memory has to be allocated for the digit string elements of the Output Digit String Configuration Table, plus for Nat1 and Nat2 or Nat.

TABLE 46

Definition of the Output Digit String Configuration Table for the Example.
Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| MNP-NCR | 1 | INRN | International | Modified Input | Prefix-0 |
| MNP-NCR | 1 | Nat1 | International | Copy Input | Nat1 |

TABLE 47

Output Digit String To Protocol Element Mapping Table for Table 46.
Output Digit String To Protocol Element Mapping Table

| SAS Application Service Id | Output Digit String Id | Protocol Element Id | Output Digit String Option |
|---|---|---|---|
| MNP-NCR | 1 | SCCP UDT Message | 1 |

TABLE 48

Input Digit String To Output Digit string Mapping Table for Table 46.
Input Digit String To Output Digit String Mapping Table

| SAS Application Service Id | Output Digit String Id | Input Digit String Id |
|---|---|---|
| MNP-NCR | 1 | 1 |
| MNP-NCR | 1 | 2 |

TABLE 48-continued

Input Digit String To Output Digit string Mapping Table for Table 46.
Input Digit String To Output Digit String Mapping Table

| SAS Application Service Id | Output Digit String Id | Input Digit String Id |
|---|---|---|
| MNP-NCR | 1 | 3 |
| MNP-NCR | 1 | 4 |

The SAS Application Service Specific Outbound Processing Configuration Table for Normal and Abnormal Completion contains up to 10 Response Actions. One or more of these Response Actions can be used to insert configured values at defined positions in the output digit string.

There are the following configurable outbound actions for this Service Handler:

Terminate SCCP Message: Calling Party Address and Called Party Address are swapped and then the SCCP message is sent back to the STP Core.

Relay SCCP Message: Calling Party Address and Called Party Address remain are not swapped and then the SCCP message is sent back to the STP Core.

Return UDTS/XUDTS/LUDTS Message: based on the received SCCP message type, the corresponding Service message type is generated, Calling Party Address and Called Party Address are swapped, and then the SCCP message is sent back to the STP Core.

Forward SCCP Message to other Service Handler.

Discard Message.

Store Message in local SAS file.

TABLE 49

Definition of the SAS Application Service Specific Outbound Processing Configuration Table for the Example—Normal Completion.

SAS Application Service Specific Outbound Processing Configuration Table—Normal Completion

| SAS Application Service Id | Number Type | Portability Status | Response Action Id1 | Service Control Data Slot Id | Output Digit String Id | Nature of Address Indicator |
|---|---|---|---|---|---|---|
| MNP-NCR | MSISDN | ONNPO | Send SCCP UDT | 1 [HLR-SCA]. | 1. | International |
| MNP-NCR | MSISDN | ONPO | Send SCCP UDT | 1 [HLR-SCA] | 1 | International |
| MNP-NCR | MSISDN | FNPI | Send SCCP UDT | 1 [HLR-SCA] | 1 | International |
| MNP-NCR | MSISDN | FNP2AFN | Send SCCP UDT | 1 [HLR-SCA] | 1 | International |
| MNP-NCR | MSISDN | FNNK2BP | Send SCCP UDT | 1 [HLR-SCA] | 1 | International |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

TABLE 50

Definition of the SAS Application Service Specific Outbound Processing Configuration Table for the Example—Abnormal Completion.

SAS Application Service Specific Outbound Processing Configuration Table—Abnormal Completion

| SAS Application Service Id | SAS Application Specific Abnormal Condition Id | Response Action Id1 | Response Action Id2 | Output Digit String Id | Nature of Address Indicator |
|---|---|---|---|---|---|
| MNP-NCR | NO MATCH | Return SCCP Message (Send UDTS) | SCCP return cause value. | None. | NULL |
| MNP-NCR | Number is ambiguous | Continue with SCCP routing (forward incoming SCCP UDT) | none | None. | NULL |

Configuration Data:

Table 11 shows Details of the Loop Detection Status Configuration Table.

Configuration Items for Outbound Digits Synthesis:

Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 12 presents the information necessary to specify an input digit string. Table 13 specifies the mapping between the Input Digit String to the Output Digit String. Table 14 specifies the mapping between the Output Digit String and the Protocol Element.

Table 12 Details of the Output Digit String Configuration Table.

Table 13 Details of the Input Digit String To Output Digit String Mapping Table.

Table 14 Details of the Input Digit String To Protocol Element Mapping Table.

A single output digit sting shall be able to be selected—based on its Id—from a set of possible output digit strings. The selection is done based on the value combination of (E.164/MSIN Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. The same principle can in the future be applied to other number parts as well.

It shall be possible to specify which action is to be done in the outbound digit processing depending on the value combination of (E.164 Number Type, Portability Status). Possible actions are the type of message to be used, etc. A table has to be present to specify this configuration data. The same principle can in the future be applied to other number ports as well.

Table 15 shows Details of the SAS Application Service Specific Outbound Processing Configuration Table—Normal Completion.

Table 15 contains the application specific outbound processing in case an entry was found in the Single Number or Range Number Table. However, it is possible that no entry is found in both tables. This abnormal outbound processing is contained in Table 50.

Table 16 shows Details of the SAS Application Service Specific Outbound Processing Configuration Table—Abnormal Completion.

Figure 29:
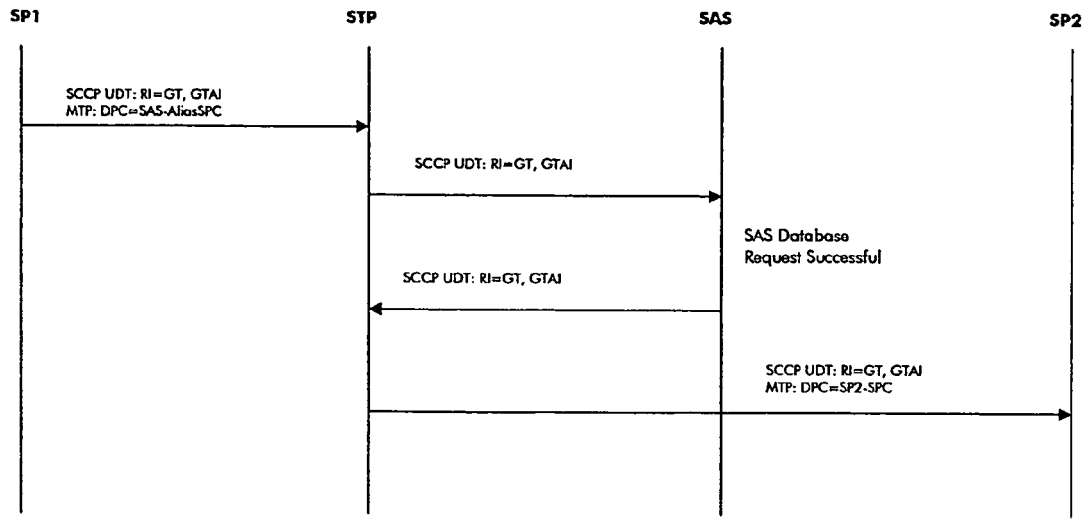
FIG. 29 shows a Query Response Scenario—Direct Response.

Scenarios:

FIG. 29 shows a Query Response Scenario—Direct Response.

Figure 30:
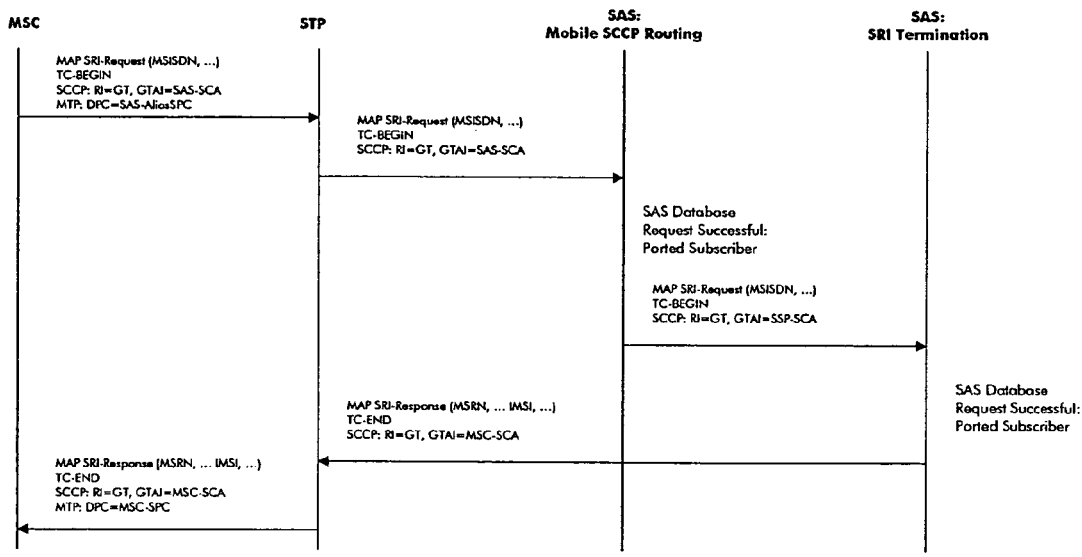
FIG. 30 shows a Query Response Scenario—Terminate TCAP Dialogue (depending on portability status)

FIG. 30 shows a Query Response Scenario—Terminate TCAP Dialogue (depending on portability status).

Figure 31:
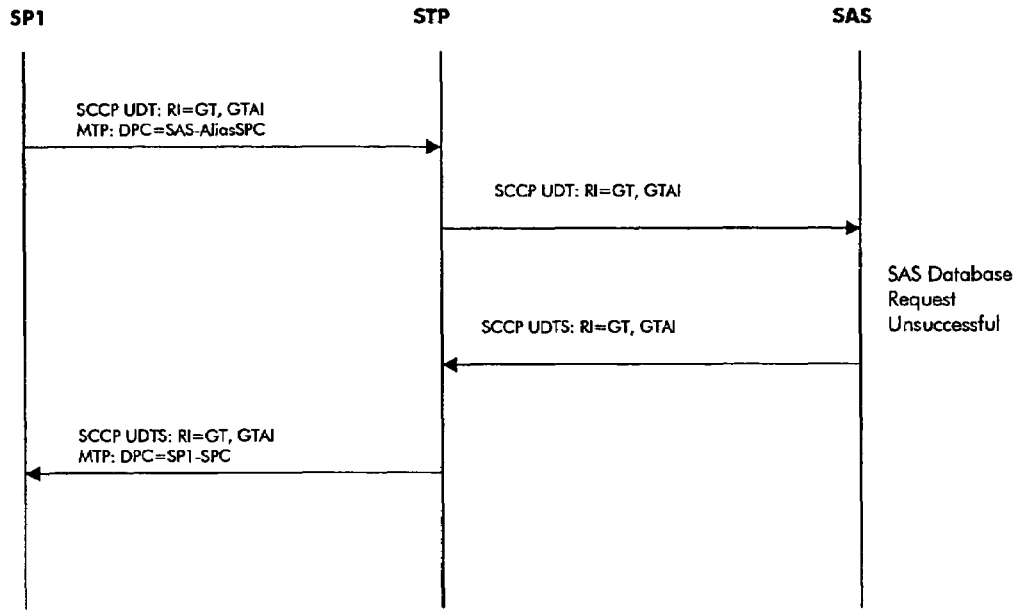
FIG. 31 shows a Query Response Scenario (Unsuccessful)—With SCCP UDTS.
Figure 32:
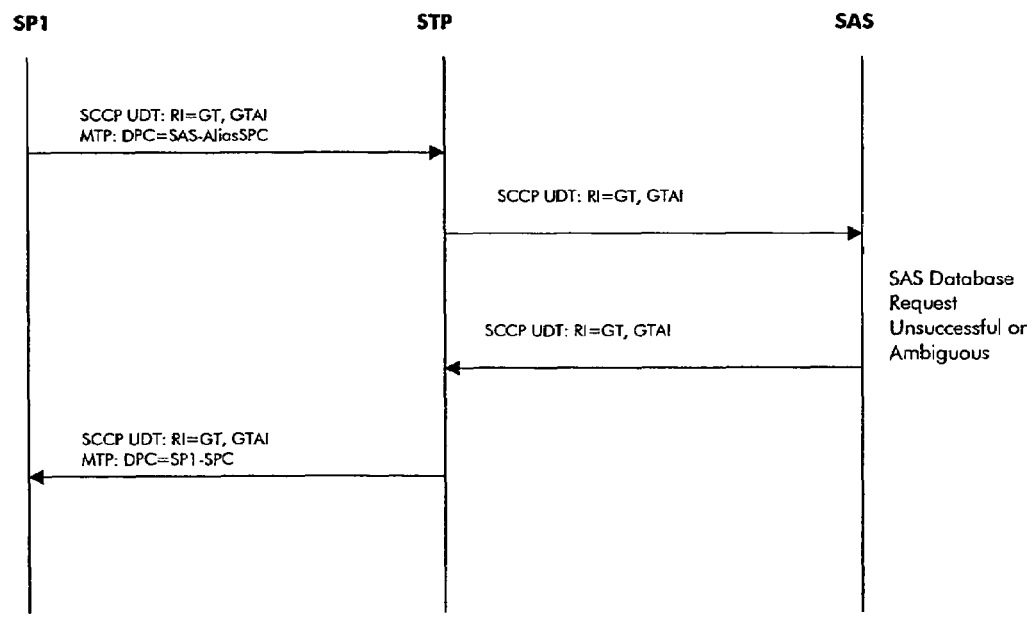
FIG. 32 shows a Query Response Scenario (Unsuccessful)—Continue With SCCP Routing.

FIG. 31 shows a Query Response Scenario (Unsuccessful)—With SCCP UDTS. FIG. 32 shows a Query Response Scenario (Unsuccessful)—Continue With SCCP Routing.

In all seven embodiments of the invention the specific configurations in the tables are examples. Other configurations are possible. The specific scenarios are also examples. Other scenarios are possible.

The SAS and the SS7 signaling server are each able to process at least one SAS Application Service request. The SAS may process one, two, three, . . . , or seven different SAS Application Service requests according to the seven embodiments of the invention, thus implementing part of the embodiments or all seven at the same time, or may process alternatively or in addition other service requests. The functionality of the SAS can easily be modified by software reprogramming and reconfiguration. The same applys to the SS7 signaling server.

What is claimed is:

1. Method to process a SAS Application Service request, including the steps of: performing an Inbound Message Analysis, performing a Service Decision, performing an Outbound Message Synthesis, wherein the Inbound Message Analysis includes an Application Specific Inbound Protocol Check, an NoAI (Nature of Address Indicator) Analysis and an Inbound Digit Analysis, wherein the Service Decision includes a Database Search and an Application Specific Evaluation of Database Search Indications, and wherein the Outbound Message Synthesis includes generating an Output Digit String making use of an application specific Output Digit String Configuration Table, which includes the parameter SAS Application Service Id and at least one of the following parameters: Output Digit String Id, Auxiliary Number Name, Nature of Address Indicator, Auxiliary Number Presence, Auxiliary Number Position.

2. Method, as set forth in claim 1, wherein the Outbound Message Synthesis includes generating an Output Digit String making further use of at least one Outbund Processing Configuration Table, which includes the parameter SAS Application Service Id and at least one of the following parameters: Number Type, Portability Status, Inbound NoAI Value, Response Action Id, Output Digit String Id.

3. Method, as set forth in claim 1, wherein the Service Decision further includes a Generic Loop Detection Analysis making use of at least one application specific Loop Detection Configuration Table, which includes the parameter SAS Application Service Id and at least one of the following parameters: SAS Database Id, SAS Database Table Id, Number type, Portability Status, Loop Detection state and Action.

4. Method, as set forth in claim 1, wherein the Database Search is performed in a Single Number Table and subsequently in a Range Number Table if the Single Number Table query indicates a NO MATCH or an Error in the Single Number Table.

5. Method, as set forth in claim 1, wherein the SAS Application Service is INAP based Number Portability, and wherein the Output Digit String Configuration Table includes INAP based Number Portability Ids (MNP-INAP-O-VM-IW).

6. Method, as set forth in claim 1, wherein the SAS Application Service is SRI (Send Routing Information) terminating Number Portability, and wherein the Output Digit String Configuration Table includes SRI terminating Number Portability Ids (MNP-SRIt-O-VM-IW).

7. Method, as set forth in claim 1, wherein the SAS Application Service is MAP Forward Short Message Access Screening, and wherein the Output Digit String Configuration Table includes Forward Short Message Access Screening Ids (MAP-FSM).

8. Method, as set forth in claim 1, wherein the SAS Application Service is Fixed SCCP Routing, and wherein the Output Digit String Configuration Table includes Fixed SCCP Routing Ids (FNP-SRF).

9. Method, as set forth in claim 1, wherein the SAS Application Service is CAP IDP Relay Mobile Number Portability, and wherein the Output Digit String Configuration Table includes CAP IDP Relay Mobile Number Portability Ids (MNP-CAP-RELAY-IW).

10. Method, as set forth in claim 1, wherein the SAS Application Service is INAP IDP Relay, and wherein the Output Digit String Configuration Table includes INAP IDP Relay Ids (INAP-IDP-RELAY-I/W).

11. Method, as set forth in claim 1, wherein the SAS Application Service is Mobile SCCP Routing, and wherein the Output Digit String Configuration Table includes Mobile SCCP Routing Ids (MNP-NCR).

12. Signaling application server (SAS), comprising at least one processor, at least one database and at least one processing software for processing at least one application service request, wherein the at least one processing software is programmed in such a way that identifying and processing at least one application service request is enabled, and wherein processing a SAS application service, comprises the steps of:

performing an inbound message analysis, performing a Service Decision including a database search, performing an Outbound Message Synthesis including generating an Output Digit String making use of an application specific Output Digit String Configuration Table, which includes the parameter SAS Application Service Id and at least one of the following parameters: Output Digit String Id, Auxiliary Number Name, Nature of Address Indicator, Auxiliary Number Presence, Auxiliary Number Position.

13. SS7 signaling server for routing SS7 links, including a signaling transfer point (STP), and a signaling application server (SAS), wherein the STP has at least one external interface to connect the STP via at least one SS7 link to at least one telecommunications unit, and an internal interface to connect the STP to the SAS, wherein the SAS comprises at least one processor, at least one database and at least one processing software for processing at least one application service request, wherein processing a SAS application service, comprises the steps of:

performing an inbound message analysis, performing a Service Decision, performing an Outbound Message Synthesis including generating an Output Digit String making use of an application specific Output Digit String Configuration Table, which includes the parameter SAS Application Service Id and at least one of the following parameters: Output Digit String Id, Auxiliary Number Name, Nature of Address Indicator, Auxiliary Number Presence, Auxiliary Number Position, and wherein the STP is capable to process incoming SS7 messages, to identify a single application service request in one incoming SS7 message, to provide the identified single application service request to the SAS for further processing.

* * * * *